United States Patent
Hiatt et al.

(10) Patent No.: US 11,235,249 B2
(45) Date of Patent: Feb. 1, 2022

(54) SERVER-BASED INDIVIDUAL PLAYTIME ESTIMATION FOR GAME ACTIVITY

(71) Applicant: SONY INTERACTIVE ENTERTAINMENT INC., Tokyo (JP)

(72) Inventors: Daniel S. Hiatt, San Francisco, CA (US); Adil Ahmed Sherwani, Oakland, CA (US); Steven Patrick Trombetta, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/687,340

(22) Filed: Nov. 18, 2019

(65) Prior Publication Data

US 2021/0146261 A1    May 20, 2021

(51) Int. Cl.
*A63F 13/79*    (2014.01)
*A63F 13/5375*    (2014.01)
*A63F 13/58*    (2014.01)
*A63F 13/67*    (2014.01)

(52) U.S. Cl.
CPC .......... *A63F 13/79* (2014.09); *A63F 13/5375* (2014.09); *A63F 13/58* (2014.09); *A63F 13/67* (2014.09)

(58) Field of Classification Search
None
See application file for complete search history.

(56) References Cited

U.S. PATENT DOCUMENTS

| | | | |
|---|---|---|---|
| 9,666,029 B1* | 5/2017 | Yu | A63F 13/35 |
| 2008/0096663 A1 | 4/2008 | Lieberman et al. | |
| 2013/0005452 A1 | 1/2013 | Chatani | |
| 2013/0006403 A1* | 1/2013 | Moore | A63F 13/35 |
| | | | 700/92 |
| 2018/0161673 A1 | 6/2018 | Pasternack et al. | |
| 2018/0239959 A1* | 8/2018 | Bui | G06F 40/103 |
| 2019/0232168 A1* | 8/2019 | Benedetto | G10L 15/26 |
| 2019/0388785 A1* | 12/2019 | Kumar | G10L 25/63 |

FOREIGN PATENT DOCUMENTS

EP    3028751    6/2016

OTHER PUBLICATIONS

Chittaro et al., "VU-Flow: A Visualization Tool for Analyzing Navigation in Virtual Environments", IEEE Transactions on Visualization and Computer Graphics, vol. 12, No. 6, Nov. 2006, pp. 1475-1485.

(Continued)

*Primary Examiner* — Jason T Yen
(74) *Attorney, Agent, or Firm* — Kilpatrick Townsend & Stockton LLP

(57) ABSTRACT

Techniques for improving a user video game experience are described. In an example, a computer system receives event data from a plurality of user devices. Each event data includes an identifier of an activity in a video game and data indicating completion of the activity. The identifier can be predefined in program code of the video game. The identifier and completion data can be received based on an execution of the program code. The event data is processed to estimate, for a user that has not completed the activity, a length of time for the activity completion. The length of time can be presented on a user interface.

20 Claims, 14 Drawing Sheets

(56) References Cited

OTHER PUBLICATIONS

Drachen et al., "Analyzing Spatial User Behavior in Computer Games Using Geographic Information Systems", Proceedings of the 13th International Mindtrek Conference, Sep. 2009, pp. 182-189.
Gagne et al., "A Deeper Look at the Use of Telemetry for Analysis of Player Behavior in RTS Games", Big Data Analytics in the Social and Ubiquitous Context: 5th International Workshop on Modeling Social Media, Oct. 5, 2011, pp. 247-257.
Hoobler et al., "Visualizing Competitive Behaviors in Multi-User Virtual Environments", IEEE Visualization, Oct. 10-15, 2004, pp. 163-170.
PCT/US2020/053462 , "International Search Report and Written Opinion", Jan. 18, 2021, 15 pages.

\* cited by examiner

800

|  | Activity Type | Playing Mode | Prediction Mode | | Presentation | | | Aggregation |
|---|---|---|---|---|---|---|---|---|
|  |  |  | Prior | During | Upper | Lower | Interval |  |
| Activity | Progress | Single | TTS | Prorate | 2 Hr | 5 min | 5 min | User |
|  |  | Multiple |  |  |  |  |  | Activity |
|  | Competitive | Single | TTA | Whole |  |  |  | User |
|  |  | Multiple |  |  |  |  |  | Activity |
|  | Challenge | Single | TTA | Whole |  |  |  | User |
|  | Open Ended | Single | N/A | N/A |  |  |  | User |
|  |  | Multiple |  |  |  |  |  | Activity |
| Sub-activity | Parent= progress or open ended | Single | TTS | Prorate | 2 Hr | 1 min | 1 min | User |
|  |  | Multiple |  |  |  |  |  | Activity |
| Task | Parent= sub-activity | Single | TTS | N/A | N/A | | | User |
|  |  | Multiple |  |  |  |  |  | Activity |

FIG. 8

SERVER-BASED INDIVIDUAL PLAYTIME ESTIMATION FOR GAME ACTIVITY

BACKGROUND

Video games are available on different computing devices. For example, a user operates a video game console and a mobile device to play a first video game and a second video game, respectively. In addition, video games are available from different sources. For example, the video game console is operable to play multiple video games from two or more different video game developers.

Given the increasing number of video games and their availability on different computing devices and from different sources, the user experience typically changes. For example, the way game play help may be sought can vary significantly between video games. In addition, the way a particular part of a video game is surfaced on a computing device as being available for playing can be unique to the particular video game.

Hence, the user experience may not be common between the video game players. There is a need for improving the user experience such that, regardless of the underlying video games, some commonality in video game functionalities becomes possible.

BRIEF SUMMARY

Techniques for improving a user video game experience are described. In an example, a computer system is used for presentation of video game-related information. The computer system includes one or more processors and one or more non-transitory computer readable storage media (e.g., one or more memories) storing instructions that, upon execution by the one or more processors, cause the computer system to perform operations.

In an example, the operations include receiving an identifier of an activity in a video game and first data indicating a completion of the activity by a video game player. The identifier is predefined in program code of the video game. The identifier and the first data are received based on an execution of the program code. The operations also include storing the identifier and the first data in a data store, determining, from the data store and based on the identifier, second data indicating completion of the activity by a plurality of video game players, and determining measurements about the completion of the activity by the plurality of the video game players based on the second data. The measurements include at least one of (i) time to successfully complete the activity or (ii) time to attempt completing the activity based on a type of the activity. The operations also include estimating, for a user that has not completed the activity, a length of time to complete the activity based on the measurements and presenting the length of time on a user device associated with the user.

In an example, the first data includes a start event and an end event. The end event includes an outcome of the completion of the activity by the video game player. Determining the measurements includes: determining, in association with the video game player and from the start event and the end event, at least one of the time of the video game player to successfully complete the activity or the time of the video game player to attempt completing the activity. In this example, estimating the length of time includes: generating, based on start events and end events from the second data, a statistical distribution of at least one of the time to successfully complete the activity or the time to attempt completing the activity, and determining the length of time from the statistical distribution based on a predefined percentile.

In an example, the operations further include determining the type of the activity based on an association between the type of the activity and the identifier of the activity. The association is stored in the data store. The type of the activity indicates that the activity includes at least one of: a progress activity, a competitive activity, or a challenge activity. The progress activity is associated with a failure and a success. The competitive activity is associated with synchronous play against a first video game player or against a first virtual player. The challenge activity is associated with asynchronous play against a second video game player or against a second virtual player. In this example, the measurements used for the progress activity includes the time per video game player to successfully complete the activity. In this example also, the measurements used for the competitive activity or the challenge activity includes the time per video game player to attempt completing the activity, and the time to successfully complete the activity includes failure times.

In an example, the operations further include rounding up the length of time to a multiple of a time interval. The time interval is based on the type of the activity.

In an example, the activity includes a plurality of tasks. Each one of the plurality of tasks is associated with an individual length of time. Each individual length time of time is estimated based on the measurements of the plurality of the video game players. Estimating the length of time includes combining the individual lengths of time of the plurality of tasks. In this example, the operations further include receiving, from a video game console of the user, the identifier of the activity and event data indicating a completion of a first task of the plurality of tasks, determining a remaining length of time to complete the activity based on the individual lengths of time of remaining ones of the plurality of tasks that have not been completed, and presenting the remaining length of time to the user.

In an example, the operations further include determining that the length of time falls within a time range predefined for the type of the activity; and selecting, based on the length of time, the activity from candidate activities associated with the video game and another video game.

In an example, the activity includes a single player task. Each one of the measurements corresponds to a start and an end of the activity per video game player.

In an example, the activity includes a multi-player task. This example, the operations further include determining a subset of the plurality of the video game players that jointly completed the multi-player task, and determining a start and an end of the activity as jointly completed by the subset. The measurements include a measurement corresponding to the start and the end.

In an example, presenting the length of time includes sending the length of time to an application executing on the user device. In this example, the operations also include receiving, from a video game console of the user, the identifier of the activity and third data indicating completion of the activity by the user, and storing the third data in the data store.

In an example, the operations further include receiving, from a video game console of the user, the identifier of the activity and third data indicating a start of the activity by the user, determining that a duration since the start exceeds the length of time by a threshold amount and that no end of the activity by the user has been received, and presenting a help option to the user.

In an example, the operations further include estimating an average time of the user for activity completion based on a playtime history of the user and playtime histories of the plurality of video game players, and adjusting the length of time based on the average of time. In this example, the operations also include generating, based on the playtime histories, a decile distribution of the plurality of video game players. Each decile corresponds to a player average time for activity completion. The operations also include determining, based on the playtime history of the user, that the user belongs to a decile of the decile distribution. The average time of the user corresponds to the decile.

In an example, the operations further include generating, based on playtime histories of the video game players, cohorts of the plurality of video game players, determining, based on a playtime history of the user, that the user belongs to a cohort of the cohorts, and determining a subset of the plurality of the video game players that belong to the cohort. The measurements are determined for the subset.

In an example, the operations further include adjusting the length of time based on at least one of: a tool available to the user in the video game to complete the activity, a familiarity measure of the user using the tool, a first location of the user in a virtual zone within the video game relative to a second location of the activity, or a travel time between the first play location and the second play location.

In an example, the operations further include adjusting the length of time based on at least one of: whether the user viewed help information about completing the activity, a type of viewed help information, or a number of the viewed help information. The help information includes at least one of: video files, audio files, or text files.

BRIEF DESCRIPTION OF THE DRAWINGS

FIG. 8 illustrates examples of activity types, according to embodiments of the present disclosure.

DETAILED DESCRIPTION

Figure 1:
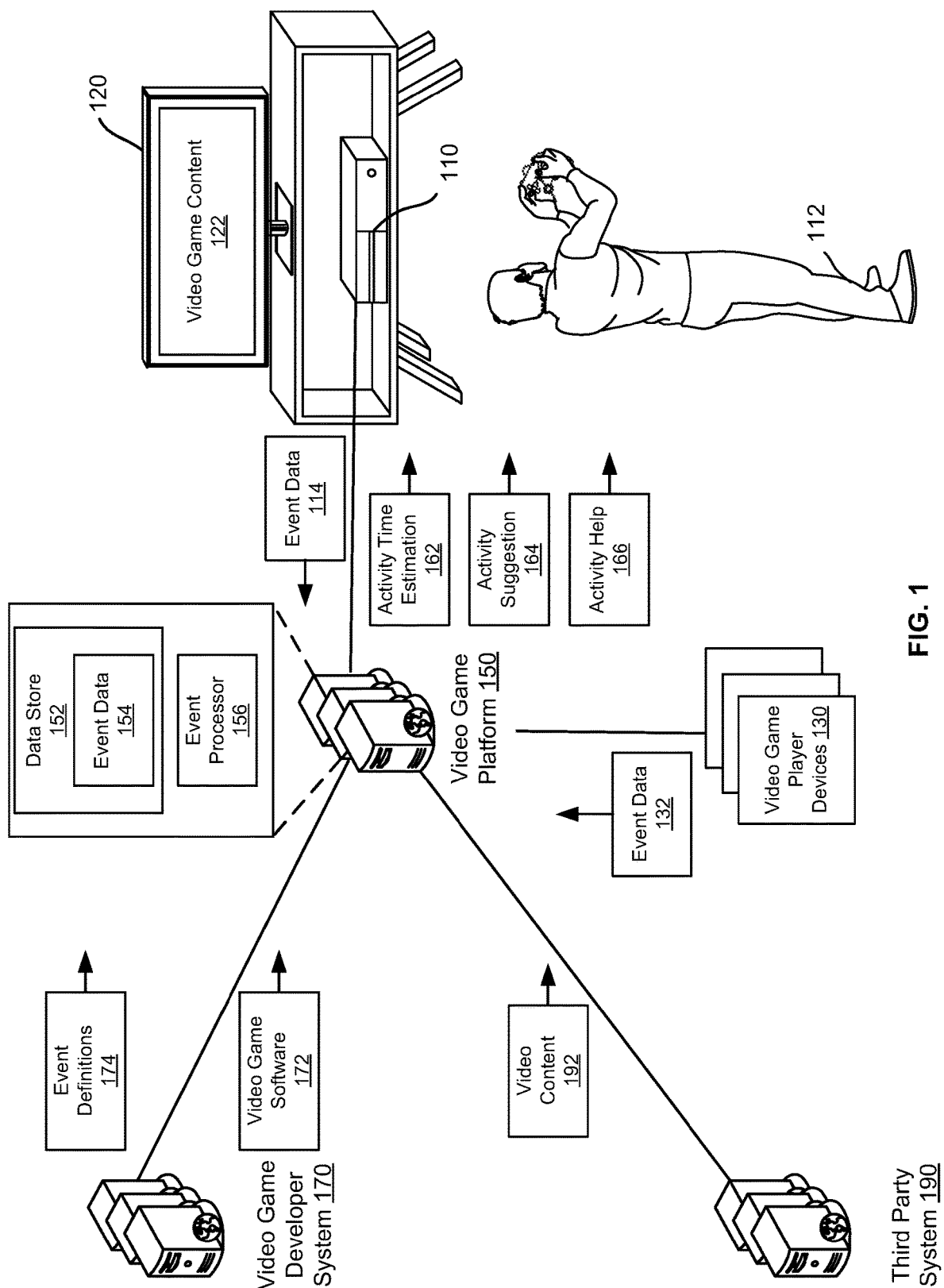
FIG. 1 illustrates an example of a computing environment for collecting and processing video game events, according to embodiments of the present disclosure.

Generally, systems and methods for improving a user video game experience are described. In an example, the user video game experience is improved by providing a unified way for, among other things, multiple video game functionalities, such as for suggesting video game activities, estimating completion time for such activities, and presenting video game help regardless of the underlying video games. This unified way need not change how a video game is developed or necessitate a common approach to video game development. Instead, instrumentation of various events in the video games is relied upon, where a video game platform (e.g., a server-based video game service) can collect and process such events based on the execution of the video games to suggest the video game activities, estimate completion times, and present the video game help at a client level and, as needed, to customize such video game functionalities to the client level.

For instance, a video game includes a plurality of activities. When an instance of the video game is executed for a video game player (whether locally on a computing device of the video game player or remotely on the video game platform), the video game platform receives events about played activities. Each event can identify the activity, its type, its start time, its end time, and/or potentially its outcome (e.g., success or failure). Events for multiple activities and multiple video game players are stored over time in a data store. The video game platform generates, for each activity and from the stored events, an estimated length of time for completing the activity. For a user that has not completed an activity of the video game, the corresponding length of time is presented on a user device associated with the user. Such completion time estimation can be performed per activity and across different video games. Hence, the same type of video functionality (e.g., completion time estimation) can be surfaced to a computing device regardless of the video games (as long as the relevant events are collected).

In addition, an estimated length of time can be customized depending on data associated with the user and/or the user device. In particular, the video game platform can generate an adjustment factor depending on historical data about how fast or slow the user may complete activities relative to other video game players, the current in-game characteristics of the user including any available mechanic (e.g., tools, capability, and/or skills), current game play data (e.g., location in the video game), any watched help video, and/or the type of the computing device (e.g., playing on a video game consoler or a mobile device, available user input device, etc.). The video game platform customizes the length of time based on the adjustment factor. Hence, the user experience is augmented by starting with data for multiple video game players and refining it with data for a single user.

Furthermore, and upon launch of the activity, events about the activity can be received. The video game platform can further process these events to update the remaining length of time to complete the activity. In particular, the activity can include multiple sub-activities. Upon a completion of a sub activity, the remaining length of time can be adjusted up or down depending on the remaining sub-activities.

To illustrate, consider an example of a video game activity related to capturing a flag of an adversary. The activity may include multiple sub-activities, such as entering a location that includes the flag and clearing an obstacle in the location. Given the events from multiple players, the video game platform determines that an estimated time to capture the flag is thirty minutes for expert players and forty-five minutes for beginner players. Upon determining that the user is a beginner player, the video game platform may generate and send a notification to a computing device of the user, where the notification indicates the forty-five minutes estimation. In this estimation, the beginner player's average times to enter the location and clear the obstacle are twenty minutes and twenty minutes respectively. Upon a launch of the activity for the user, events may be received indicating that the location entering sub-activity took thirty minutes (rather than the average of twenty minutes). Hence, the video game platform can generate and send a second notification (or update the existing one) to indicate that the remaining length of time (e.g., to clear the obstacle) is twenty minutes (or this can be adjusted up given the slower than average playtime), rather than fifteen minutes (e.g., forty-five minutes minus thirty minutes).

Embodiments of the present disclosure provide many technical advantages over existing video game platforms. In particular, the user interface (e.g., GUI) is improved relative to existing user interfaces because relevant information (e.g., timing about activities, activity suggestions, etc.) can be presented therein in a common manner across different applications and different computing devices. For instance, by collecting events per activity, video game, and video game player, a video game platform of the present disclosure can accurately estimate a length of time for completing an activity by a user. Because an accurate estimation can be generated, multiple video game functionalities become possible. In particular, an estimated length of time for an activity in a video game can be presented on the user interface in a presentation manner common to other activities (in the video game and other video games) and to different types of computing devices (e.g., the same information can be surfaced on a video game console and on a mobile device). In addition, the activity may be presented in a suggestion notification only if its completion length of time is smaller than a predefined threshold. Hence, different activities can be suggested in a common manner across the video games by considering their completion length of time.

FIG. 1 illustrates an example of a computing environment for collecting and processing video game events, according to embodiments of the present disclosure. As illustrated, the computing environment includes a video game console 110, video game player devices 130, a video game platform 150, a video game developer system 170, and a third party system 190. Video games are available to the video game console 110 from the video game developer system 170 through the video game platform 150. Video content, such as help videos demonstrating how video game activities can be played, is also available to the video game console 110 from the third party system 190 through the video game platform 150. The video game platform 150 collects, stores, and processes events from the video game player devices 130 and the video game console 110 to provide various video game-related functionalities including, for instance, suggesting video game activities, estimating completion time for such activities, and presenting video game help.

In an example, the video game console 110 represents a computing device available to a user 112 and operable to interact with one or more applications including video games. A display 120 communicatively coupled or integrated with the video game console 110 can present video game-related data, including video game content 122, to the user 112. Other types of computing devices can be available to the user 112 including for instance, a smartphone, a tablet, a laptop, a desktop computer, or other devices with suitable memories and processors.

The video game console 110 can execute a video game locally to present the video game content 122 on the display 120. Additionally or alternatively, the video game consoles 110 can receive the video game content 122 based on an execution of an instance of the video game application on the video game platform 150, the video game developer system 170, or another remote computer system. The video game can also be downloadable to the video game console 110 from such systems.

Further, the video game console 110 can, directly or through the video game platform 150, download or stream video content from the third party system 190 for presentation on the display 120. An example of video content includes a video file generated by the video game developer 170 and uploaded to the third party system 190, where this video file demonstrates how a video game can be played, a set of activities in the video game can be played, or a set of mechanics in an activity can be used to play the activity. A mechanic generally represents at least one of a set of tools, a set of capabilities, or a set of skills available to play an activity or a portion of an activity. Another example of video content includes a video file generated by one of the video game player devices and uploaded to the third party system 190 directly or through the video game platform 190, where the video file records the game play of a video game player operating the video game player device. Likewise, a similar video file can be uploaded to the third party system 190 from the video game console 110.

In an example, the video game player devices 130 represent computing devices of video game players that may, but need not, include the user 112. Similar functionalities can be provided on each one of the video game player devices and the video game console 110.

In an example, the video game system 170 represents a computer system that includes a set of computing resources for developing video games and available to a video game developer. In particular, the video game system 170 can store video game software 172, upload such software 172 to the video game platform 150, and/or download such software 172 to the video game console 110.

The video game software 172 of a video game is program code executable to present and interact with video game content of the video game. The program code can include predefined instrumentations to generate events upon the execution of the program code. In particular, the program code includes a set of event definitions 174, where an event definition represents code defining an identifier of an event and data to be reported for the event. Examples of such event definitions 174 are further described herein below and are predefined in the program code of the video game according to event templates available from the video game platform 150. Such event templates can be defined by a service provider of the video game platform 150 and can be commonly used across multiple video game developer systems 170.

In an example, the third party system 190 represents a computer system, such as one or more content servers, for providing video content 192 to the video game console 110 directly or indirectly through the video game platform 150. As explained herein above, the video content 192 can include video files demonstrating how a video game can be played, a set of activities in the video game can be played, or a set of mechanics in an activity can be used to play the activity. The video content 192 can be uploaded to the third party system 190 from the video game developer system 170, the video game console 110, and/or one or more of the video game player devices 130 directly or indirectly through the video game platform 150.

In an example, the video game platform 150 represents a computer system that provides various video-game related functionalities to the video game console 110. For instance, the video game platform 150 is set-up as a hub between the video game console 110, the video game player devices 130, the video game developer system 170, and third party system 190. In particular, the video game software 172 and the video content 192 can be downloaded to the video game consoler 110 through the video game platform 150. An instance of a video game based on video game software stored on the video game platform 150 can be instantiated for the video game console 110. A video file can be streamed through the video game platform 150 to the video game console 110. And communications data (e.g., messages, commands, etc.) can be exchanged between the video game console 110 and the video game player devices 130 through the video game platform 150.

Furthermore, the video game platform receives event data 114 from the video game console 110 and event data 132 from the video game player devices 130 and stores such received data in a data store 152 as event data 154. An event processor 156 of the video game platform 150 processes the event data 154 to generate and send any of an activity time estimation 162, an activity suggestion 164, and an activity help 166 to the video game console 110 for presentation on the display 120.

Received event data (any of the event data 114 or event data 132) represents data reported from a device (e.g., the video game console 110 or one of the video game player devices 130 as application) for an event based on an execution of program code of a video game, where the program code includes an event definition for the event. The activity time estimation 162 represents an estimated length of time to complete an activity in the video game, which may be referred to herein as completion time. The activity suggestion 164 represents information suggesting an activity available to the user 112 in the video game and not previously performed or completed by the user 112. An activity help 166 includes information, such as a video file, textual description, and/or a graphical description about completing an activity in the video game or using a mechanic in at least a portion of the activity. The processor 156 executes logic that, for instance, performs a statistical analysis across a subset of the event data 154 associated with the activity to generate the activity time estimation 162, the activity suggestion 164, and the activity help 166. In addition, the processor 156 can execute logic that customizes any of the activity time estimation 162, the activity suggestion 164, or the activity help 166 based on a context of the user 110 in the video game and/or within the platform and on the type of the video game console 110.

Generally, an activity is a unit of game play inherent to the structure of a video game. Different categories of activities exist including progress activities, competitive activities, challenge activities, and open ended activities. The activity can be defined in a program code as object with multiple properties. The properties include an activity identifier, a name, and a category. The activity identifier is a unique identifier of the activity. When an event about the activity is reported to the video game platform 150, the corresponding event data refers to the activity identifier. The name can be a short localized name of the activity. Other properties are possible including, for instance, a description (e.g., a longer description of the activity), an image of the activity, a default availability (e.g., whether the activity is available to all video game players before launching the video game), whether completion of the activity is required to complete the video game, whether the activity can be played repeatedly in the video game, and nested Tasks (child activities, also referred to herein as sub-activities). Multiple events about the activity are possible.

An example of an event about the activity can indicate changes in activity availability for a video game player (e.g., the user 112). This is primarily used to decide what activities to display and to remove spoiler block for those activities (where an activity having a spoiler may not be surfaced to the video game player). A property of this event includes, for instance a list (e.g., array) of activities that are currently available.

An example of an event about the activity can indicate that the video player is currently participating in the activity or task (e.g., a child activity). A property of this event includes, for instance the activity identifier of the activity. Another property can optionally be a time corresponding to the start of the participation in the activity.

An example of an event about the activity can indicate the end of the activity or task (e.g., a child activity). A property of this event includes, for instance the activity identifier of the activity. Another property can optionally be a time corresponding to the end of the participation in the activity. Yet another property can optionally be an outcome of the activity, such as completed, failed, or abandoned.

The video game platform 150 can also collect data about a zone in a video game, where this data is reported similarly to the events based on predefinitions in program code of the video game. The zone represents an area of a game world of the video game (e.g., a virtual world) with a single coordinate system. The zone may have a two-dimensional (2-D) map image associated with it, used to display locations on the zone. The zone can be defined in the program code as an object with multiple properties. The properties include a zone identifier and a name. The zone identifier is a unique identifier of the zone. The name can be a short localizable name of the zone. Other properties are possible including, for instance, an indication of whether the object should be treated as hidden for spoiler block uses cases (the default may be set to false), a map (e.g., a high resolution image for the zone 2-D map), a view projection (e.g., a matrix (4×4) to convert from three-dimensional (3-D) work coordinates to 2-D map position), and an image (e.g., a display image for the zone if different from the map). Multiple events about the zone are possible.

An example of an event about the zone can indicate an update to the current in-game location of the video game player. This event can be reported regularly, or whenever the player's in-game location changes significantly. A property of this event includes the zone identifier. Other properties are possible, such as optionally position (e.g., x,y,z position of the video game player character (the virtual player of the video game player) in the zone) and orientation (e.g., x,y,z vector indicating the video game player character's direction).

Another example of an event about the zone can indicate the video game player's zone, location, and orientation, at the time of starting the activity. This event can enable location-based help. A property of this event includes the activity identifier. Other properties are possible, such as optionally the zone identifier and the position and orientation of video game player's character in the video game.

Yet another example of an event about the zone can indicate the video game player's zone, location, and orientation, at the time of ending the activity. This event can also enable location-based help. A property of this event includes the activity identifier. Other properties are possible, such as optionally the outcome of the activity, the zone identifier, and the position and orientation of video game player's character in the video game.

The video game platform 150 can also collect data about an actor in a video game, where this data is reported similarly to the events based on predefinitions in program code of the video game. The actor represents an entity with behaviors in the video game. The actor can be player-controlled or game-controlled, and this can change dynamically during game play. The actor can be defined in the program code as an object with multiple properties. The properties include an actor identifier and a name. The actor identifier is a unique identifier of the actor. The name can be a localizable name of the actor. Other properties are possible including, for instance, an indication of whether the object should be treated as hidden for spoiler block uses cases (the default may be set to false), an image of the actor, and a short description of the actor. Multiple events about the actor are possible.

An example of an event about the actor can indicate that a change to the video game player's selection of actor(s). Selected actors represent the actors the video game player is controlling in the video game, and can be displayed on the video game player's profile and other presentation spaces. There can be more than one actor selected at a time. The video game should replace the list of actors upon loading save data. A property of this event includes a list (e.g., array) of actors which are currently selected by the video game player.

The video game platform 150 can also collect data about a mechanic in a video game, where this data is reported similarly to the events based on predefinitions in program code of the video game. The mechanic represents an item (e.g., tool), capability, skill, or effect that can be used by the video game player or the video game to impact game play (e.g. bow, arrow, stealth attack, fire damage). The mechanic generally excludes items that do not impact game play (e.g. collectibles). The mechanic can be defined in the program code as an object with multiple properties. The properties include a mechanic identifier and a name. The mechanic identifier is a unique identifier of the mechanic. The name can be a short localizable name of the mechanic. Other properties are possible including, for instance, an indication of whether the object should be treated as hidden for spoiler block uses cases (the default may be set to false), an image of the mechanic, and a short description of the mechanic. Multiple events about the mechanic are possible.

An example of an event about the mechanic can indicate that mechanics available to the video game player have changed. Availability of a mechanic represents that the mechanic is available in the game world for the video game player to use, but may necessitate the video game player to go through some steps to acquire it into inventory (e.g. download from a store, pick up from the world) before using it. This event can also be used to indicate lifting of spoiler block on the mechanic object, and to filter help tips to avoid suggesting use of a mechanic that is unavailable. The video game should replace the list of mechanics upon loading save data. A property of this event includes a list (e.g., array) of mechanics which are currently available.

Another example of an event about the mechanic can indicate that the video game player's inventory has changed. Inventory refers to mechanics that are immediately usable to the video game player without having to take additional steps in the video game before using it. Inventory information can be used to estimate a player's readiness for an activity. The video game should replace the list of inventory upon loading save data. A property of this event includes a list (e.g., array) of mechanics which are currently in inventory.

Yet another example of an event about the mechanic can indicate that the video game player's load out has changed. Load out represents the mechanics that are most immediately accessible to the video player, and is the subset of inventory which is displayable to the video game player. The video game should replace the list of mechanics upon loading save data. A property of this event includes a list (e.g., array) of mechanics which are now part of the active load out.

A further example of an event about the mechanic can indicate that the mechanic has been used by or against the video game player. Properties of this event include a list (e.g., array) of mechanics which were used (e.g. fire arrow, fire damage) and whether the mechanics were used by or against the video game player. Other properties are possible, such as optionally an initiator actor identifier (e.g., an identifier of the actor that initiated the use of the mechanic), a zone identifier of the initiator actor, and a position of the initiator actor.

Another example of an event about the mechanic can indicate that the mechanic had an impact on game play (e.g. an arrow hit a target). Properties of this event include a list (e.g., array) of mechanics which were used (e.g. fire arrow, fire damage) and whether the mechanics were used by or against the video game player. Other properties are possible, such as optionally the initiator actor identifier, the zone identifier of the initiator actor, the position of the initiator actor, a target actor identifier (e.g., an identifier of the actor targeted by the mechanic), a zone identifier of the target, a position of the target actor, and an identifier of a mechanic that mitigates the initiator's mechanic(s).

The video game platform 150 can also collect data about game media in a video game, where this data is reported similarly to the events based on predefinitions in program code of the video game. The game media represents a piece of media (text, audio, video, image) related to the video game, provided by the game developer. The game media may exist in-game (e.g. cut-scene, audio log, book) or may not (e.g. developer commentary). The game media can be defined in the program code as an object with multiple properties. The properties include a game media identifier, a name, a format, a category, an unlock rule, and a uniform resource locator (URL). The game media identifier is a unique identifier of the game media. The name can be a localizable name of the game media. The format can indicate the media format, such as whether the game media is an image, audio, video, text, etc. The category indicates a type of the game media, such as whether the game media is a cut-scene, audio-log, poster, developer commentary, etc. The unlock rule indicates whether the game media should be unlocked for all video game players or based on an activity or a specific game media event. The URL references a server-provisioned media file, where this server can be part of the game developer system 170 or the video game platform 150. Other properties are possible including, for instance, an indication of whether the object should be treated as hidden for spoiler block uses cases (the default may be set to false), an entitlement (e.g., indicating that only video game players who own a particular video game entitlement can unlock the game media), and an activity identifier (e.g., to associate the game media with a particular activity). Multiple events about the game media are possible.

An example of an event about the game media can indicate that a particular piece of game media has been unlocked for the video game player. A property of this event includes the game media identifier.

Another example of an event about the game media can indicate that a particular piece of game media has started in the video game. The game media object should be considered unlocked for the video game player at the corresponding time. A property of this event includes the game media identifier.

Yet another example of an event about the game media can indicate that a particular piece of game media has ended in the video game. A property of this event includes the game media identifier.

Figure 2:
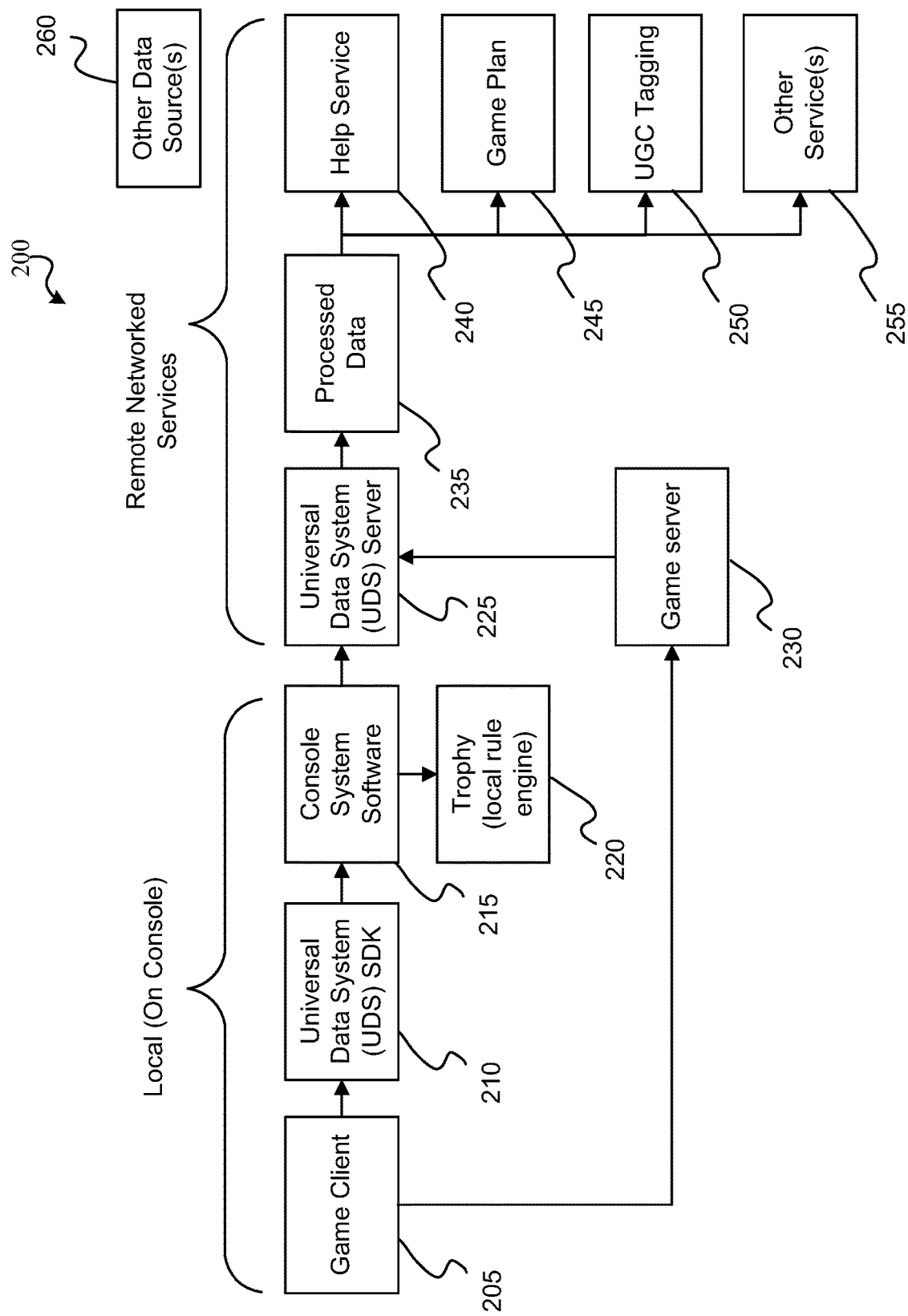
FIG. 2 illustrates an example of a system architecture for providing users with contextual information regarding available game activities, according to embodiments of the present disclosure.

FIG. 2 illustrates an example of a system architecture for providing users with contextual information regarding available game activities, according to embodiments of the present disclosure. In some embodiments, the exemplary system architecture 200 includes a game client 205, a universal data system (UDS) software development kit (SDK) 210, console system software 215, a local rule engine 220, a UDS server 225, a game server 230, processed data 235, and one or more other remote networked services, including a help service 240, game plan 245, user generated content (UGC) tagging 250, and other service(s) 255. The help service 240 may also receive information from other data source(s) 260. Some of the components of the system architecture 200 are examples of components of the video game platform 150 of FIG. 1. For instance, the UDS server 225 and the game server 230 are components of the video game platform 150.

The game client 205 and game server 230 provide contextual information regarding at least one application to a universal data system (UDS) server 225 via a UDS data model describing the logical structure of UDS data used by the UDS SDK 210. The UDS data model enables the platform (e.g., the video game platform 150) to realize remote networked services, such as the help service 240, game plan 245, UGC tagging 250, and other service(s) 255 that require game data, without requiring a game to be patched separately to support a service. The UDS data model assigns contextual information to a portion of information in a unified way across games. The contextual information from the game client 205 and UDS SDK 210 is provided to the UDS server 225 via the console system software 215. It is to be understood that the game client 205, UDS SDK 210, console system software 215, and local rule engine 220 may run on a computer or other suitable hardware for executing at least one application.

The UDS server 225 receives and stores contextual information from the game client 205 and game server 230 from at least one application. To be sure, the UDS server 225 may receive contextual information from a plurality of game clients and game servers for multiple users. The information may be uniformly processed 235 and then received by the plurality of remote networked services 240, 245, 250, and 255.

Figure 3:
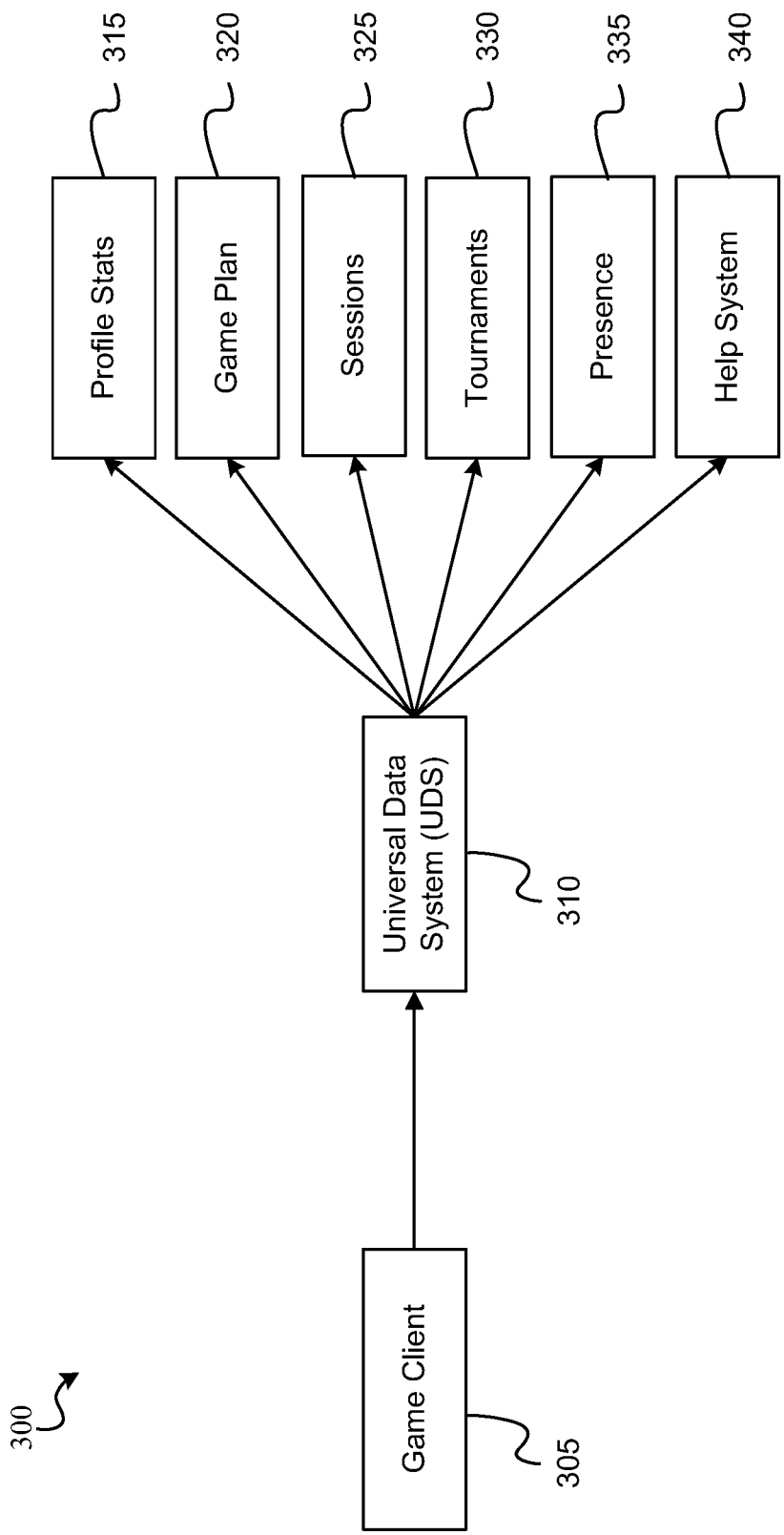
FIG. 3 illustrates another example of a system architecture, according to embodiments of the present disclosure.

FIG. 3 illustrates another example of a system architecture 300, according to embodiments of the present disclosure. A game client 305 sends contextual information to a UDS server 310, which provides the contextual information in a unified data model to a plurality of remote networked services, including profile stats 315, game plan 320, sessions 325, tournaments 330, presence 335, and help system 340.

Figure 4:
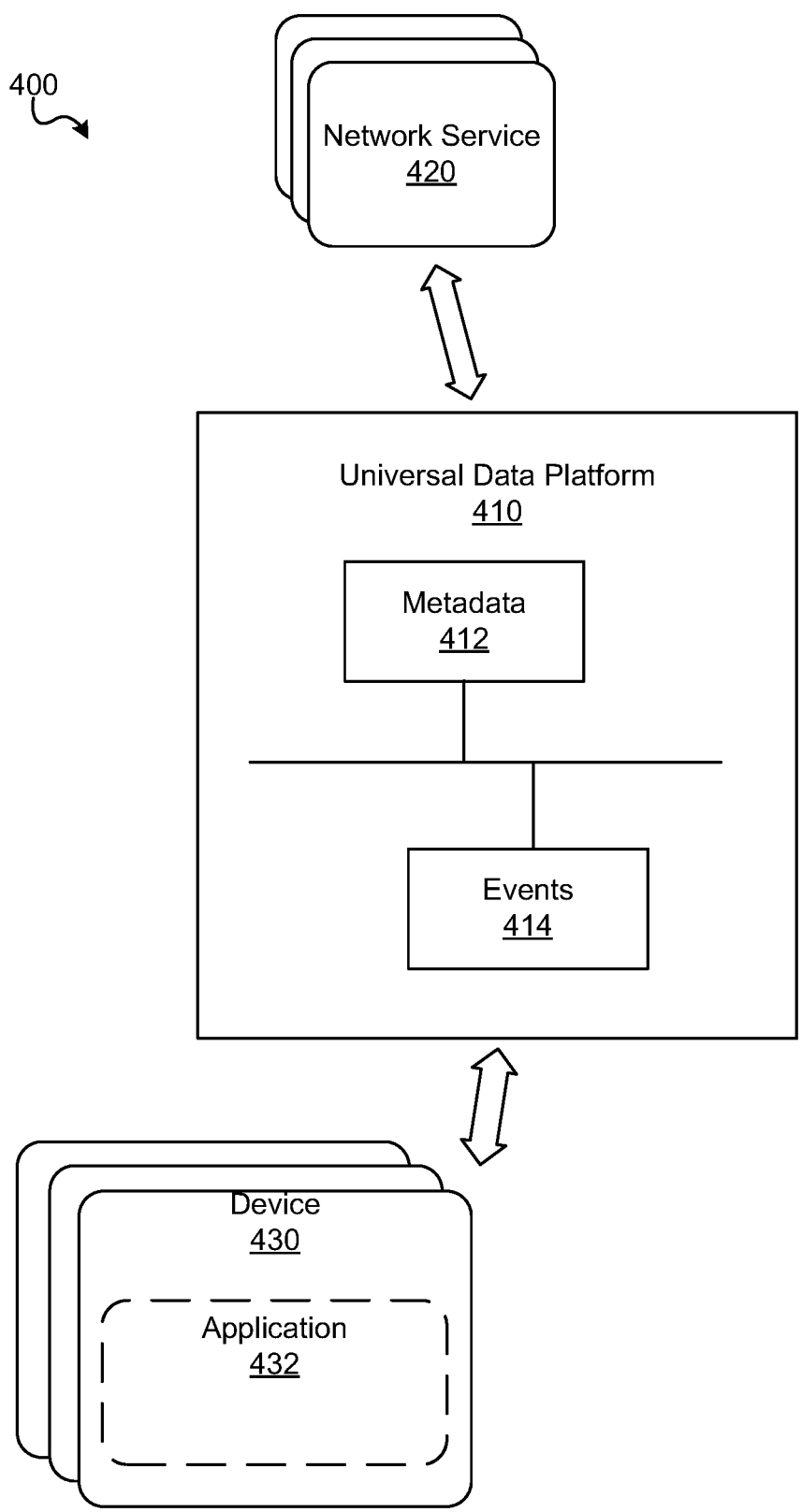
FIG. 4 illustrates an example of a system for providing a data model for a universal data platform, according to embodiments of the present disclosure.

FIG. 4 illustrates an example of a system 400 for providing a data model for a universal data platform 410, according to embodiments of the present disclosure. Some of the components of universal data platform 410 are examples of components of the video game platform 150 of FIG. 1. In one example embodiment, system 400 can include at least one device 430 configured to execute at least one of a plurality of applications 432, each application having an application data structure. The universal data platform 410 can be executed on one or more servers. The universal data platform 410 can include a data model which is uniform across the plurality of application data structures. The data model can include metadata 412 corresponding to at least one object indicated in the data model, and events 414 corresponding to a trigger condition associated with at least one metadata entry. The values of the metadata 412 and events 414 can be associated with a user profile. The universal data platform 410 can be configured to receive application data from the at least one device 430 and store the application data within the data model. The system 400 can also include a plurality of remote networked services 420 configured to access the application data from the universal data platform 410 using the data model.

In various embodiments, the metadata 412 may include: a list of all activities that a user can do in an application, an activity name, a description of the activity, a state of the activity (whether available, started, or completed), whether the activity is required to complete an objective or campaign, a completion reward for the activity, an intro or outro cut-scene, an in-game location, one or more conditions that must be met before the activity becomes available, and a parent activity that contains the activity as a sub-activity. Metadata 412 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 412. In addition, the metadata 412 may indicate whether or not a particular activity, entity (such as a character, item, ability, etc.), setting, outcome, action, effect, location, or attribute should be marked as hidden.

Events 414 may be fired in response to several various trigger conditions. For example, such trigger conditions may include: an activity that was previously unavailable becomes available, a user starts an activity, a user ends an activity, an opening or ending cut-scene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 414 may include further information regarding a state of the application when the events 414 were triggered, for example a timestamp, a difficulty setting and character statistics at the time a user starts or ends an activity, success or failure of an activity, or a score or duration of time associated with a completed activity. It is to be understood that metadata 412 and events 414 may include any and all contextual information related to activities described in the present disclosure.

Figure 5:
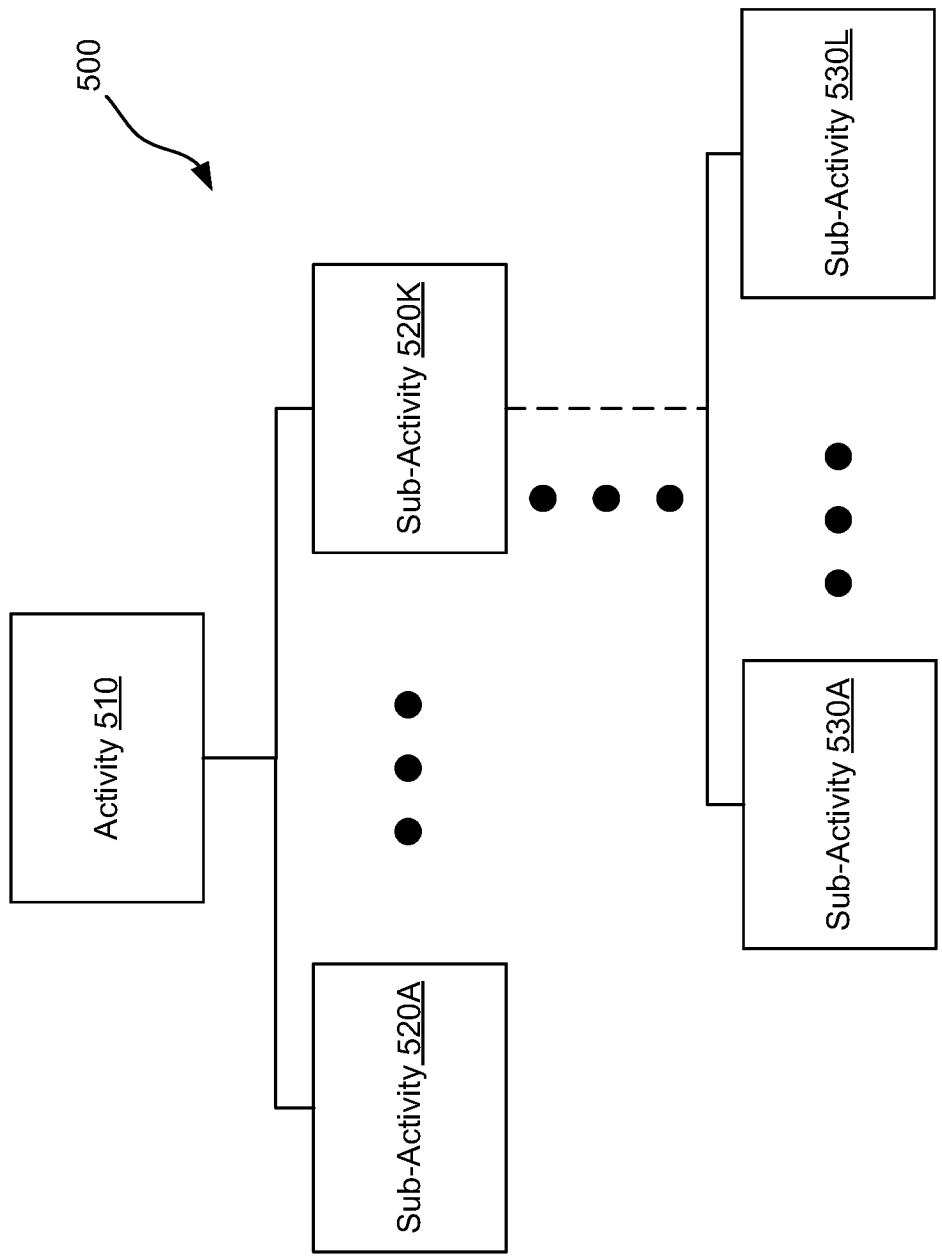
FIG. 5 illustrates an example of an activity hierarchy, according to embodiments of the present disclosure.

FIG. 5 illustrates an example of an activity hierarchy, according to embodiments of the present disclosure. As illustrated, an activity 510 can include multiple nested tasks, referred to herein as sub-activities, forming a hierarchy 500. The activity 510 can be a node on top of the hierarchy 500 (e.g., a root node) and can have a set of child sub-activities 520A-520K at the next level of the hierarchy 500. In turn each ones of the sub-activities 520A-520K may be a child node of the activity 510 and, possible, a parent node to a set of sub-activities at the next hierarchy level. For instance, the sub-activity 520K is a parent node to a set of sub-activities 530A-530L. This type of association between nodes, each representing a sub-activity, can be repeated at the different levels of the hierarchy 500. A set of mechanics can be associated with each node indicating that such mechanic(s) can be available or usable in the activity corresponding to the node.

As explained herein above, the activity 510 has an activity identifier. Each sub-activity also represents an activity and, thus, has an activity identifier too. Likewise, each of the mechanics has a mechanic identifier. Associations between the activity identifiers themselves and between the activity identifiers and the mechanic identifiers can be defined based on the hierarchy 500. Such associations can be stored in objects that define the activities (or sub-activities) and/or that define the mechanics and/or can be stored in events that relate to such objects. For instance, the activity identifier of the sub-activity 520K can be associated with the activity identifier of the activity 510 and/or the activity identifiers of the sub-activities 530A-530L. Similarly, the activity identifier of the sub-activity 530L can be associated with the activity identifier of the sub-activity 520L and/or the mechanic identifiers of the mechanics 540A-540M. Further, a mechanic identifier of a mechanic can be associated with an activity identifier.

Figure 6:
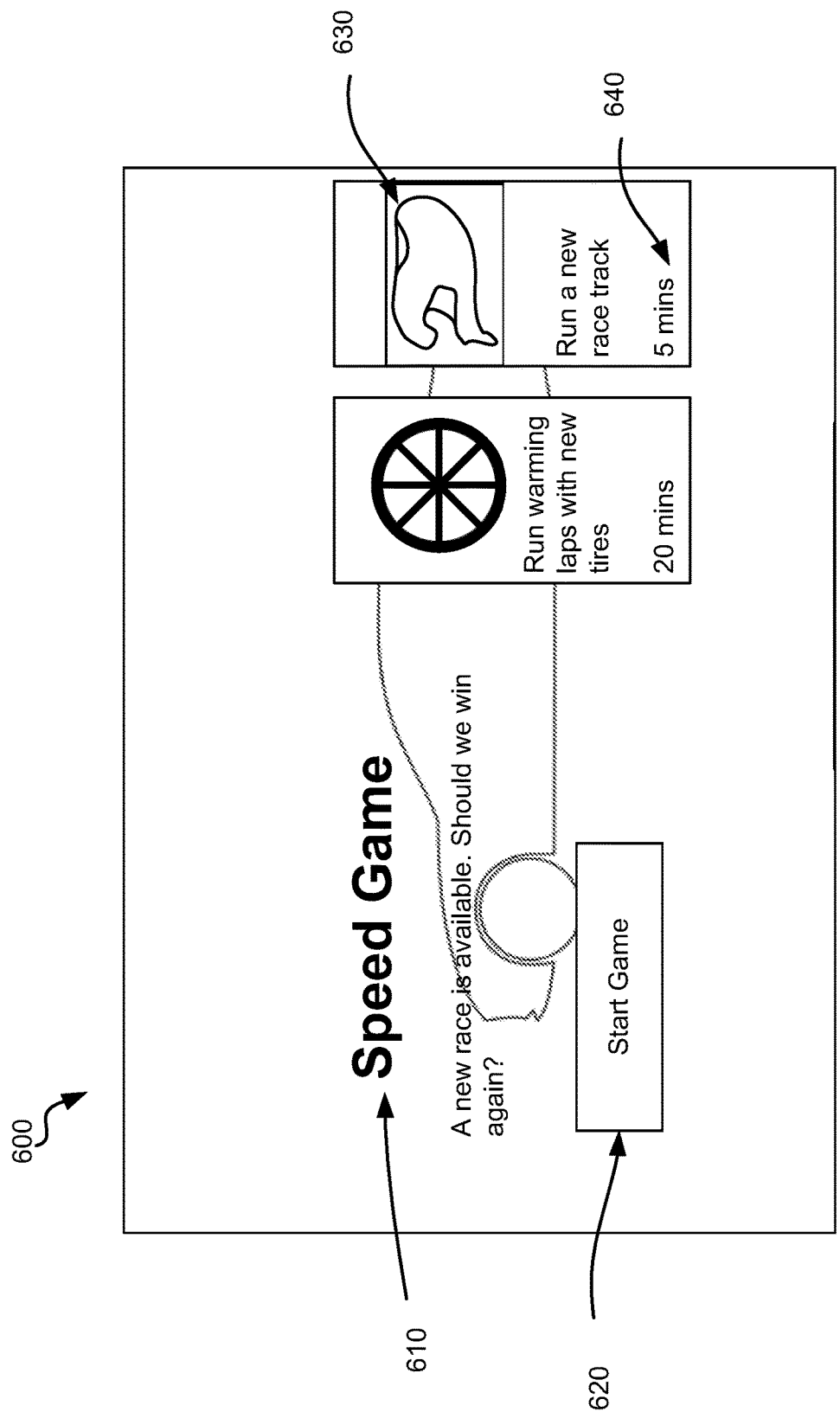
FIG. 6 illustrates an example of a user interface for presenting information about an estimated length of time for completing an activity, according to embodiments of the present disclosure.

FIG. 6 illustrates an example of a user interface for presenting information about an estimated length of time for completing an activity, according to embodiments of the present disclosure. In particular, a video game console (e.g., the video game console 110 of FIG. 1) presents video game-related functionalities to a user of a video game (e.g., the user 112 of FIG. 1). In addition to enabling game play, the game-related functionalities present the estimated length of time (e.g., estimated completion time) for the activity. User input can be received to launch the activity following the presentation of its estimated completion time.

As illustrated in FIG. 6, the video game console presents a user interface 600 on a display (e.g., the display 120 of FIG. 1). The user interface 600 includes a video game page that shows various information and functionalities that relate to a video game. In an example, a short description 610 of the video game is presented (e.g., game title, the developer, an edition of the video game). A selectable option 620 to start the video game is also presented. Other information and functionalities are also possible.

In addition, a set of activity suggestions 630 is presented. Each one of the activity suggestions 630 can be presented in a window, an icon, an overlay, or any other graphical user interface element within the user interface 600. An activity suggestion can identify an activity in the video game, where the activity is available to the user and not previously attempted or completed by the user. For instance, the activity suggestion includes a textual description and an image of the activity, where such data is available from the object that defines the activity.

Further, the activity suggestion includes an estimated completion time 640 for the activity (e.g., shown as twenty minutes for the first suggested activity about running warming laps with new tires and as five minutes for the second suggested activity about running a new race track). The estimated completion time 640 can be generated from event data association with the activity, where the event data is collected from a plurality of video game devices and for a plurality of video game players that have played the activity.

A user selection of a suggested activity can trigger the video game console to launch the activity (e.g., locally or remotely based on an instance of the video game on the video game platform). Video game content related to the activity can be presented in the user interface 600.

Figure 7:
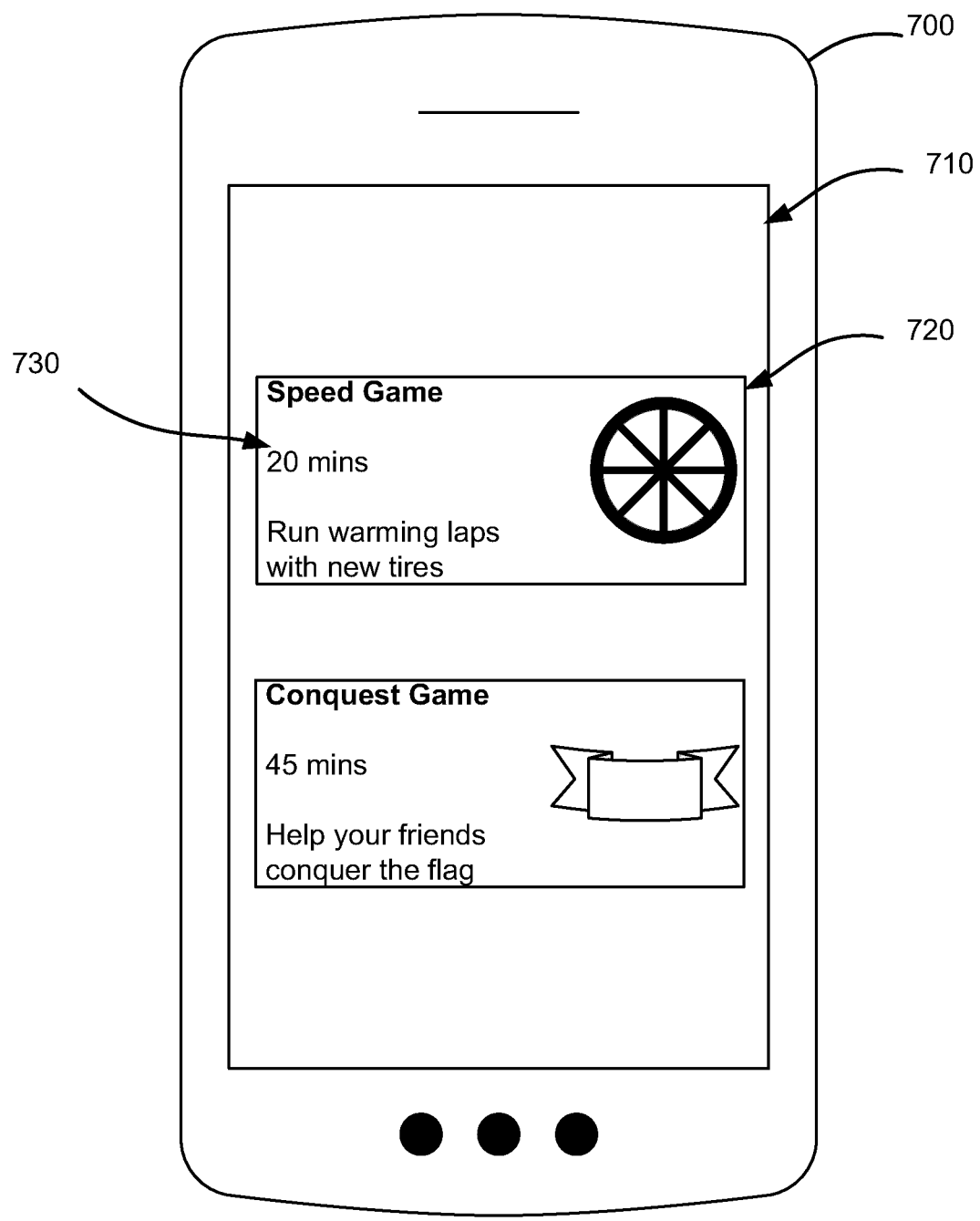
FIG. 7 illustrates another example of a user interface for presenting information about an estimated length of time for completing an activity, according to embodiments of the present disclosure.

FIG. 7 illustrates another example of a user interface for presenting information about an estimated length of time for completing an activity, according to embodiments of the present disclosure. Here, a user device 700, other than a video game console, such as a smart phone, can execute an application that provides access to functionalities from a video game platform (e.g., the video game platform 150 of FIG. 1) via a user interface 710 of the user device 700. The functionalities include receiving, via a pull mechanism or a push mechanism, activity suggestions 730 for presentation in the user interface 710. The activity suggestions 730 can relate to activities in different video games, where each of such activities is available to the user and not previously attempted or completed by the user. For instance, each activity suggestion identifies the respective video game and includes a textual description and an image of the activity, where such data is available from the object that defines the activity. In addition, each activity suggestion includes an estimated completion time 730 for the activity (e.g., shown as twenty minutes for the first suggested activity about running warming laps with new tires in the speed game and as forty-five minutes for the second suggested activity about helping a friend conquer a flag in a conquest game). Here also, the estimated completion time 720 for each suggested activity can be generated from event data association with the activity, where the event data is collected from a plurality of video game devices and for a plurality of video game players that have played the activity.

A user selection of a suggested activity can trigger the user device 700 to queue in a user account of the user (e.g., download the activity, add the activity to a list of activities to be performed, etc.) such that the activity can be subsequently launched for the user. Alternatively or additionally, the user selection can trigger the user device 700 and/or a video game console associated with the user account to launch the activity (e.g., locally or remotely based on an instance of the video game on the video game platform).

FIG. 8 illustrates examples of activity types 800, according to embodiments of the present disclosure. The completion time of an activity in a video game can be estimated based on the activity type of an activity. The activity type can be set as a property in an object that defines the activity.

As illustrated, multiple activity types 800 are possible: a progress activity, a competitive activity, a challenge activity, and an open ended activity. The progress activity is associated with a failure and a success (e.g., its outcome if not abandoned is either a failure, a success). The progress activity can be played in a single player mode or in a multi-player mode. The competitive activity is associated with synchronous play (e.g., playing in real-time) against another video game player or against a virtual player (e.g., against the video game). The challenge activity is associated with asynchronous play (e.g., not in real-time) against another video game player or against a virtual player. The open ended activity is associated with a game world where no particular outcome is predefined (e.g., the activity need not end in abandonment or in a failure or a success). The progress activity, the competitive activity, and the open ended activity can be played in a single player mode or in a multi-player mode. In comparison, the challenge activity is typically played in the single player mode.

The approach to estimate the completion time of an activity varies depending on its activity type. For example, prior to a start of a progress activity in the single player mode, the completion time for the progress activity is based on measurements about time to succeed (TTS). The measurements are derived from event data about the progress activity recorded for multiple video game players, where each of such players played the activity in the single player mode, and are statistically analyzed (e.g., as an average or mean) to generate the completion time. The measurements for TTS of a single video game player includes, as applicable, the time duration between a start and an end of the progress activity with a failure outcome (multiple of these time durations as applicable) and the time duration between a start and an end of the progress activity with a success outcome. For instance, if a video game players succeeded an activity after having failed "n" number times, the TTS measurement of the activity for the video game player may include the "n" time duration(s) of the activity with the failure and the time duration of the activity with success. An estimated completion time of the activity may be calculated by multiplying an average time duration of the activity with the failure and an average of the number of failure until success, and adding an average time duration of the activity with success to it. Once the progress activity is started, its estimated length of time is prorated given the elapsed time and the remaining sub-activities that are associated with the activity.

When a progress activity is available in the multi-player mode, a similar approach can be adopted, where TTS measurements are used prior to the start of the progress activity and prorating is applied upon its start. Here, however, event data is analyzed at a group level rather than individual player level. In particular, event data received for a group of video game players that played the progress activity together is identified. Time durations for failures and successes of these video game players are aggregated. The aggregated time duration across multiple video game players groups are averaged (or some other statistical function is applied) to generate the estimated completion time. In other words, the estimated completion time for a multi-player progress activity represents the length of time estimated for a group of video game players to complete the activity.

In an example, prior to a start of a competitive activity in the single player mode, the completion time for the competitive activity is based on measurements about time to attempt (TTA). The measurements are derived from event data about the competitive activity recorded for multiple video game players, where each of such players played the activity in the single player mode, and are statistically analyzed (e.g., as an average or mean) to generate the completion time. The measurements for TTA of a single video game player includes, as applicable, the time duration between a start and an end of the progress activity that was attempted regardless of the outcome, if any, of the competitive activity. Multiple of these time durations as applicable if the single video game player repeated the competitive activity. Once the competitive activity is started, its estimated length of time is not prorated. Instead, the estimated completion time can be updated based on the difference between the original estimation and the elapsed time.

When a competitive activity is played in the multi-played video game, the measurements for TTA correspond to time durations of video game player groups. For instance, if a video game player group includes a first and second video game players, and if the TTA of this group can be the aggregation of the first video game player's TTA and the second video game player's TTA or, as applicable depending on the competitive activity itself, to the longest of the first video game player's TTA and the second video game player's TTA.

In an example, prior to a start of a challenge activity in the single player mode, the completion time for the challenge activity is based on measurements for TTA. The measurements are derived from event data about the challenge activity recorded for multiple video game players, where each of such players played the activity in the single player mode, and are statistically analyzed (e.g., as an average or mean) to generate the completion time. Once the challenge activity is started, its estimated length of time is not prorated. Instead, the estimated completion time can be updated based on the difference between the original estimation and the elapsed time.

In an example, an estimated completion time for an open ended activity may not be generated. Accordingly, if such an activity is suggested, no estimated completion time may be included in the activity suggestion.

In an example, the estimated completion time for an activity can be a factor in determining whether to suggest the activity. In particular, completion time can be bounded by upper and lower limits. As illustrated, the upper limit is two hours and the lower limit is five minutes (although other time ranges are possible, and these ranges can vary based on the activity type). If the estimated completion time of the activity falls between these two bounds, the activity can be suggested. If outside the two bounds (e.g., longer than two hours or shorter than five minutes), the activity is typically not suggested.

In addition, when the estimated completion time is generated, this completion time may be rounded up for presentation in a user interface. The rounding up is performed to a multiple of a time interval, where the time interval can be based on the type of the activity. As illustrated, the time interval is set to five minutes (although a different value can be used and can vary based on the activity type). For instance, rather than showing that the true estimate is thirteen minutes and twenty-nine seconds, the completion time is presented as fifteen minutes (a rounding up to three times the five minutes time interval).

As explained in connection with FIG. 5, an activity can include a set of sub-activities. The sub-activities may, but need not, be of a same type. Hence, it is possible that an activity has multiple activity types. The estimated completion time of the activity can be an aggregate of the estimated completion times of the sub-activities. Conversely, the estimated completion time of a sub-activity can be performed depending on its activity type as described herein above.

In an illustration, when a sub-activity has a parent that is a progress activity or an open ended activity, TTS measurements can be used for the sub-activity prior to its start and prorating can be used once it is started. The upper and lower limits can be defined as two hours and one minute with a time interval of one minute for rounding up. In addition if a task is a child of a sub-activity and has no other child dependencies, TTS measurements can be used for the task.

Figure 9:
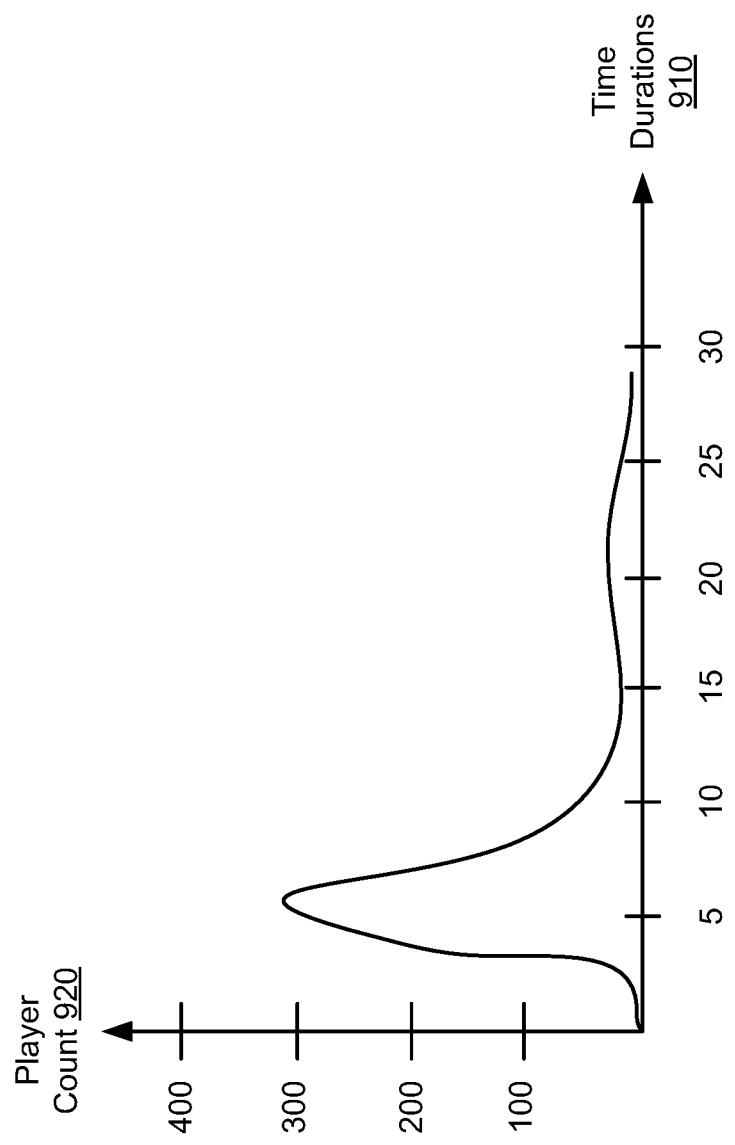
FIG. 9 illustrates an example of measurements generated from video game events, according to embodiments of the present disclosure.

FIG. 9 illustrates an example of measurements generated from video game events, according to embodiments of the present disclosure. In particular, event data about an activity is collected over data from multiple video game player devices for multiple video game players. For instance, an event is received from a video game player and includes, in its property, an activity identifier of the activity. The event data is processed to determine, for each video game player (if the activity corresponds to a single player mode) or for each group of video game players (if the activity corresponds to a multi-player mode), a start and an end of the activity and, as applicable its outcome. The time duration between the start and the end is a measurement used to compute a TTS or a TTA, as applicable (e.g., based on the activity type as described in connection with FIG. 8).

A statistical distribution can be generated from the measurements, where the statistical distribution associates time durations 910 (e.g., the TTS's and/or TTA's determined for the different video game players) with the count 920 of the video game players. The time durations 910 can be set as a variable of the distribution. For instance, each time a video game player completed the activity in a particular time duration, the count associated with that particular time duration is increased by one. Of course, other statistical distributions are possible to generate from the time durations 910 and the count 920, such as a probability distribution function, a cumulative distribution function, and the like.

The completion time for the activity can be estimated from the distribution. For instance, the completion time is estimated as an average or a mean of the time durations 910, as a particular time duration that corresponds to a predefined percentile (e.g., to the eightieth percentile), or to an average or a mean time durations belonging to a percentile range (e.g., between the seventieth and eightieth percentiles).

Figure 10:
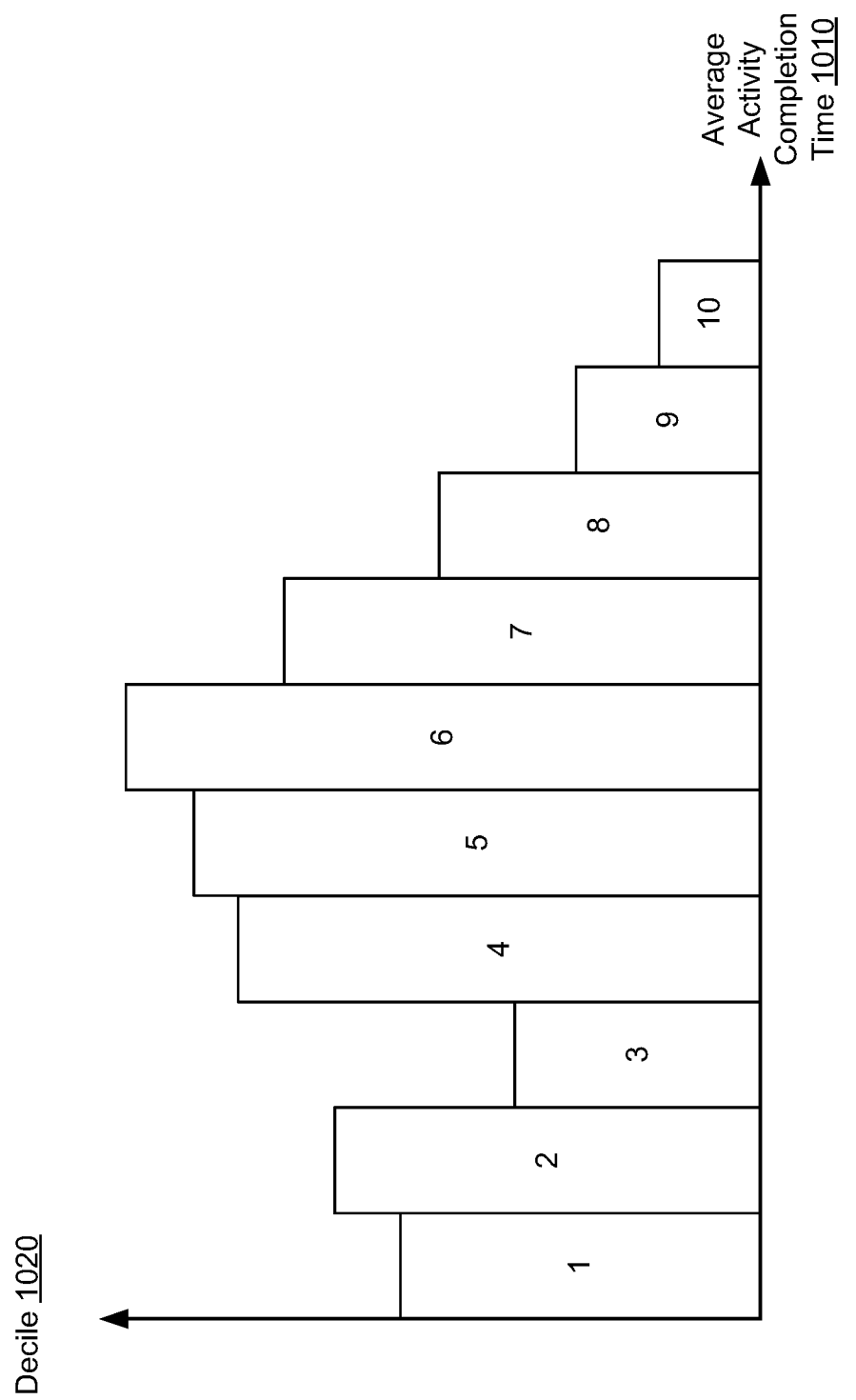
FIG. 10 illustrates an example of a player distribution generated from video game events, according to embodiments of the present disclosure.

FIG. 10 illustrates an example of a player distribution generated from video game events, according to embodiments of the present disclosure. The player distribution can be used to generate an adjustment factor usable to customize an estimated completion time for a particular user.

In an example, event data is received from video game player devices for different video game players. The event data for a video game player can indicate an activity in a video game (e.g., by including an activity identifier of the activity) and a time duration of the activity (e.g., by including indications of a start and an end of the activity, where the time duration can be derived as TTS and/or TTA depending on the activity type). Such time durations are statistically analyzed for each player to determine an average completion time per video game player, where this average completion time 1010 can be for an activity in general or in a particular video game and/or for an activity type in general or in the particular video game. A statistical distribution of the average completion time 1010 for the different video game players can be generated, where the average completion time 1010 is a variable of the distribution.

In an example, the distribution associates the average completion time 1010 with deciles 1020. In particular, the corpus of video game players can be divided in ten equal subsections, where each subsection corresponds to a particular range of the average completion time 1010. For instance, the largest average completion time is sixty minutes. Thus, the ten subsections correspond to six minutes increments. The first decile can correspond to video game players that have an average completion time between zero and six minutes, the next decile can correspond to video game players that have an average completion time between six and twelve minutes, and so on and so forth, until the tenth decile corresponding to video game players that have an average completion time between fifty-four and sixty minutes.

Each decile can be associated with a value for the adjustment factor. In an example, the larger the average completion time corresponding to a decile is, the larger the value associated with that decile is. In this example, the adjustment factor is used as a multiplier of the estimated completion time for a particular activity. For instance, the value increases by 0.2 between the decile. Accordingly, the first decile is associated with a value of 0.2 value, the second decile is associated with a value of 0.4 and the last decile is associated with a value of 2.

To adjust the estimated completion time for a particular activity to a particular user, the average completion time of the user is determined from event data associated with the user. A particular decile corresponding to the average completion time is determined and the value associated with the decile is looked up. The adjustment factor is set to the value and the estimated completion time is multiplied by the adjustment factor.

To illustrate, the estimated completion time for the particular activity is ten minutes. Based on the playtime history of the user, the user is determined to belong to the second decile associated with the 0.4 value (e.g., the user belongs to the second fastest group of video game players). Accordingly, the estimated completion time is adjusted to the user from ten minutes to four minutes.

Other ways to set the adjustment factor are also possible. In a first example, cohorts of the video game players are generated. For instance, the cohorts are generated from their playtime histories and indicate slow, medium, and fast players. In another illustration, the cohorts are generated based on characteristics of the video game players and/or their video game player devices (e.g., a cohort for expert players and a cohort for beginner players, a cohort per mechanic, or a cohort per type of input device, etc.). Each cohort is associated with a value for the adjustment factor. Data about the user, such as the user's playtime history, characteristics, and/or user device, can be processed to determine that the user belongs to a cohort of the cohorts. The value for that cohort is determined and set as the adjustment factor.

In a second example, the adjustment factor is set as a function of a mechanic available to the user in the video game to complete the activity, a familiarity measure of the user using the tool, a location of the user in a virtual zone within the video game relative to a location of the activity in the virtual zone, a travel time between the two locations, or reviewed help tips (e.g., video, text, etc.) about the activity. For instance, the estimated completion time is generated from event data about the particular activity. That event data can indicate a certain percentage of video game players that successfully completed the activity by using, at least in part, a particular mechanic. The adjustment factor is set as a function of the mechanic. Hence, if the mechanic is available to the user, the adjustment factor can decrease the estimated completion time, or, conversely, if the mechanic is not available to the user, the adjustment factor can increase the estimated completion time. In another illustration, the playtime history of the user can be processed to determine a frequency of use of the mechanic and a success rate of the use (e.g., based on event data indicating the use and the impact). The familiarity measure can be set as a function of the frequency and success rate (e.g., the larger the frequency and the larger the success rate are, the larger the familiarity measure). And the adjustment factor can be set as a function of the familiarity measure (e.g., the larger the familiarity measure is, the smaller the adjustment factor is when this factor is used as a multiplier). In a further illustration, the further away the locations are from each other, the larger the adjustment factor is set (when it is used as a multiplier) to account for the user's video game character (e.g., the user's virtual player) to travel between the locations. The travel time can be estimated (e.g., from the distance and possible speed) and the adjustment factor can be set to be equal to the travel time (in which case, the adjustment factor is added to the estimated completion time rather than being used as a multiplier). In yet another illustration, if the user reviewed help tips specific to how to complete the activity, the adjustment factor can be decreased (when it is used as a multiplier). The larger the number of reviewed help tips, the larger the decrease may be.

In another example, cohorts are also generated but the adjustment factor is not used. Instead, the user is determined to belong to a cohort. And the event data corresponding to a particular activity and to the video game players that belong to that cohort is determined. The estimated completion time for the particular activity is determined for the user based on this specific event data.

Figure 11:
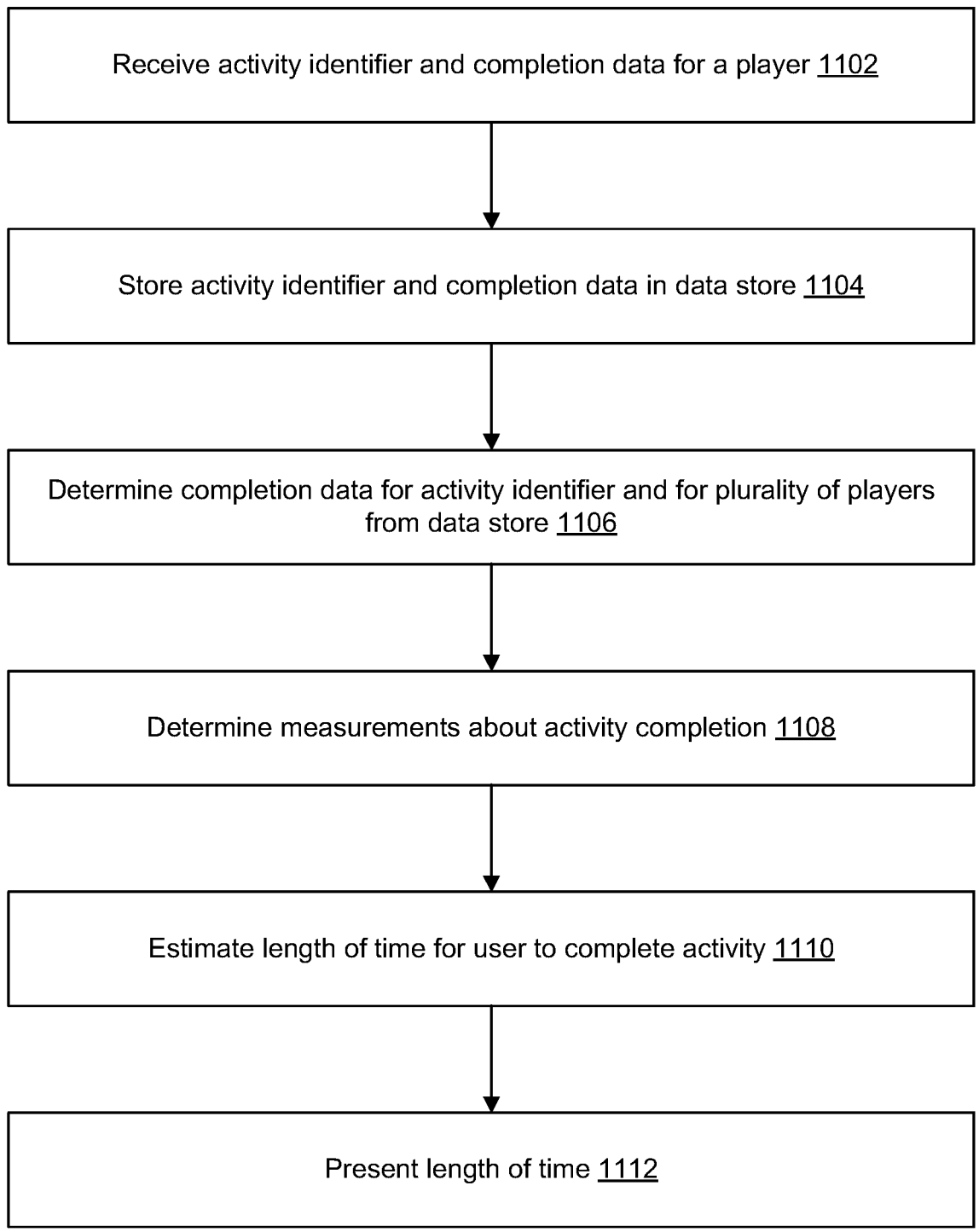
FIG. 11 illustrates an example of a flow for estimating a length of time of an activity in a video game, according to embodiments of the present disclosure.
Figure 12:
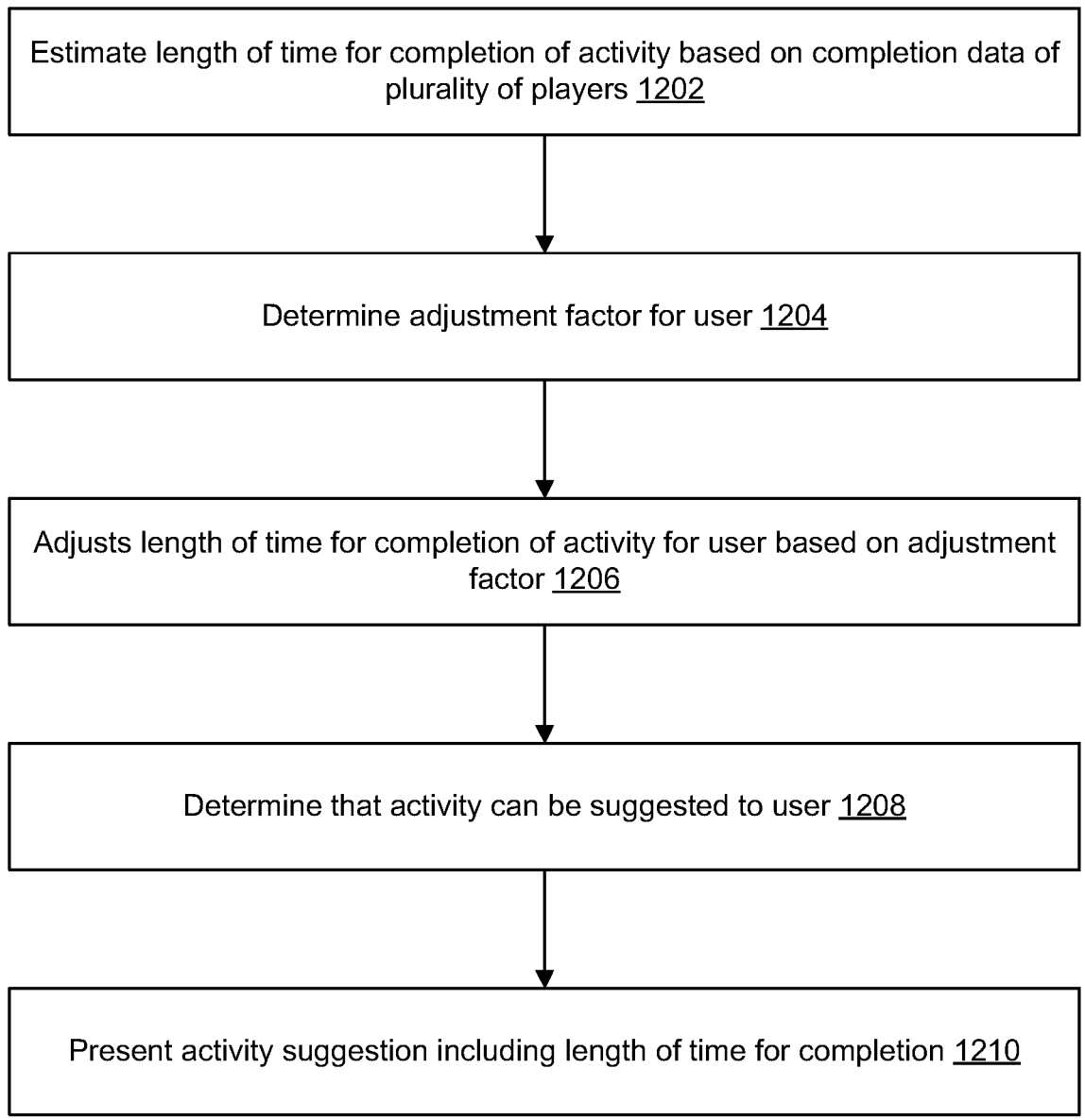
FIG. 12 illustrates an example of presenting an activity suggestion based on an estimated length of time, according to embodiments of the present disclosure.
Figure 13:
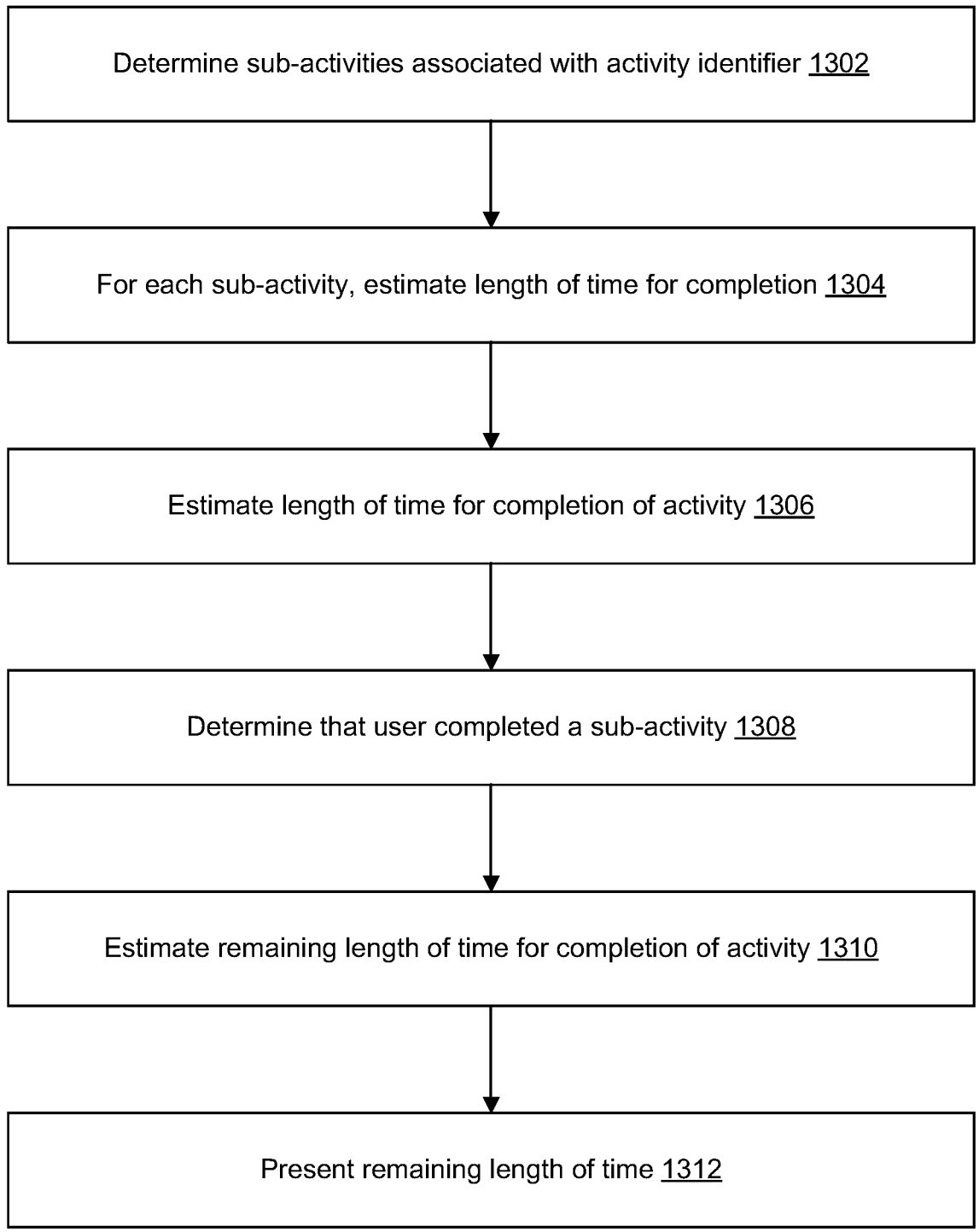
FIG. 13 illustrates an example updating an estimated length of time of an activity based on sub-activities, according to embodiments of the present disclosure.

FIGS. 11-13 illustrate example flows for estimating a length of time of an activity in a video game for a user. The operations of the flows can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

FIG. 11 illustrates an example of a flow for estimating a length of time of the activity in the video game (e.g., an estimated completion time), according to embodiments of the present disclosure. In an example, the flow includes operation 1102, where the computer system receives an identifier of the activity and completion data indicating a completion of the activity by a video game player. As explained herein above, the activity identifier is predefined in program code of the video game. The activity identifier and the completion data are received based on an execution of the program code on, for instance, the video game console, the video game platform, and/or a remote system. For instance, the activity identifier and the completion data are received as events. Each of such events include the activity identifier as a property, either the start or the end of the activity as a property, and, optionally, an outcome of the activity.

In an example, the flow includes operation 1104, where the computer system stores the activity identifier and the completion data in a data store. For instance, the received events are stored as event data in the data store. The data store may store similar events for a plurality of other video game players, each of such events indicating either the activity or another activity (which can be in the video game or in another video game).

In an example, the flow includes operation 1106, where the computer system determines completion data for the activity and for the plurality of video game players from the data store. For instance, the activity identifier is used to look up the stored event data and retrieve events that reference the activity identifier. The event data can indicate, for each of the video game players, a start and an end of the activity and, optionally, an outcome of the activity. The start, end, and outcome represent the completion data.

In an example, the flow includes operation 1108, where the computer system determines measurements about the completion of the activity by the plurality of the video game data based on the determined completion data. The measurements include at least one of TTS or TTA based on the type of the activity. For instance, if the activity is a progress activity, TTS measurements are derived from the start, end, and outcomes indicated by the event data. If the activity is a competitive activity or a challenge activity, TTA measured are derived from the start and end indicated by the event data. If the activity is played in a multi-player mode activity, the measurements can also include aggregate time durations of the video game players forming groups of the video game players.

In an example, the flow includes operation 1110, where the computer system estimates, for a user that has not completed the activity, the length of time to complete the activity based on the measurements. In particular, statistical analysis can be applied to the measurements, where, for instance, an average, a mean, or a percentile function is used to derive the estimated length of time as described in connection with FIG. 9. In addition, this estimate can be modified specifically to the user, as described in connection with FIG. 10.

In an example, the flow includes operation 1112, where the computer system presents the length of time on a user device associated with the user. For instance, the user device can be the video game console or a mobile device, as illustrated in connection with FIGS. 6-7. The length of time can be presented as part of suggesting the activity. In addition, the length of time can be rounded up to a multiplier of a time interval, where this time interval may depend on the type of activity.

FIG. 12 illustrates an example of presenting an activity suggestion based on an estimated length of time, according to embodiments of the present disclosure. In an example, the flow includes operation 1202, where the computer system estimates the length of time based on completion data for the plurality of video game players.

In an example, the flow includes operation 1204, where the computer system determines an adjustment factor. For instance, the adjustment factor is determined prior to the start of the activity by the user. Different techniques are available to determine the adjustment factor as described in connection with FIG. 10. In a first technique, a decile distribution of the average completion time is generated based on a playtime history of the plurality of video game players. The average completion time of the user is also determined based on the user's playtime history and a determination to which decile the user belongs. The adjustment factor is set based on the decile and is used to increase or decrease the estimated length of time. In a second technique, cohorts are generated based on the playtime history of the plurality of the video game players, the characters of the video game players, and/or the video game player devices. Data about the user is processed to determine which cohort the user belongs to. And either the estimated completion time is adjusted up or down based on the cohort, or, event data corresponding to the activity and to only the video game players belonging to this cohort is statistically analyzed to generate the estimated completion time specifically for the user. In yet another technique, the user's location in the video game, the location of the activity, the mechanic(s) used by the other video game players to complete the activity, the mechanic(s) available to the user, the number of reviewed help tips about completing the activity, and/or other parameters can be considered to adjust the estimated length of time up or down.

In an example, the flow includes operation 1206, where the computer system adjusts the estimated length of time for the user based on the adjustment factor. For instance, the adjustment factor is set as a multiplier and the estimated time is adjusted by multiplying it by the adjustment factor. In another illustration, the adjustment factor is added or subtracted from the estimated length of time. For instance, the adjustment factor is set to be equal to an estimated travel time between locations in the video game and that estimated travel time is added to the estimated length of time.

In an example, the flow includes operation 1208, where the computer system determines that the activity can be suggested to the user. For instance, the computer system considers the estimated length of time (as adjusted to the user) as a factor in selecting the activity from candidate activities to suggest. In particular, if the estimated length of time falls within a predefined time range (e.g., between a predefined upper limit and lower limit), the activity can be suggested.

In an example, the flow includes operation 1210, where the computer system presents the activity suggestion including the length of time for completion.

FIG. 13 illustrates an example updating the estimated length of time of the activity based on sub-activities, according to embodiments of the present disclosure. In an example, the flow includes operation 1302, where the computer system determines sub-activities associated with the activity identifier. For instance, the activity can be formed by a set of sub-activities that may follow a particular hierarchy, similarly to the hierarchy described in connection with FIG. 5. The sub-activities can be identified based on associations of activity identifiers of these sub-activities with the activity identifier of the activity.

In an example, the flow includes operation 1304, where the computer system can estimate, for each sub-activity, a length of time to complete the sub-activity. Each of the lengths of time can be determined based on a statistical analysis, similar to the statistical analysis described in connection with FIG. 11.

In an example, the flow includes operation 1306, where the computer system estimates the length of time of the activity based on the lengths of time of the sub-activities. For instance, the length of time is estimated prior to the start of the activity and can be a sum of the lengths of time.

In an example, the flow includes operation 1308, where the computer system determines a completion of a sub-activity of the sub-activities by the user. For instance, event data is received from the video game console including the activity identifier of the sub-activity and indicating an end of this sub-activity.

In an example, the flow includes operation 1310, where the computer system determines remaining length of time to complete the activity. For instance, the remaining sub-activities that have not been completed yet are identified. Their individual estimated lengths of time are added to generate the remaining length of time. Further, a comparison (e.g., a ratio) of the actual length of time used to complete the activity to its estimated length of time can be used to set an adjustment factor. The sum of the individual estimated lengths of time can be adjusted up or down based on the adjustment factor.

In an example, the flow includes operation 1312, where the computer system presents the remaining length of time. For instance, the activity is launched and video game content related to the activity is presented on the user interface. The remaining time can be displayed simultaneously on the user interface.

Figure 14:
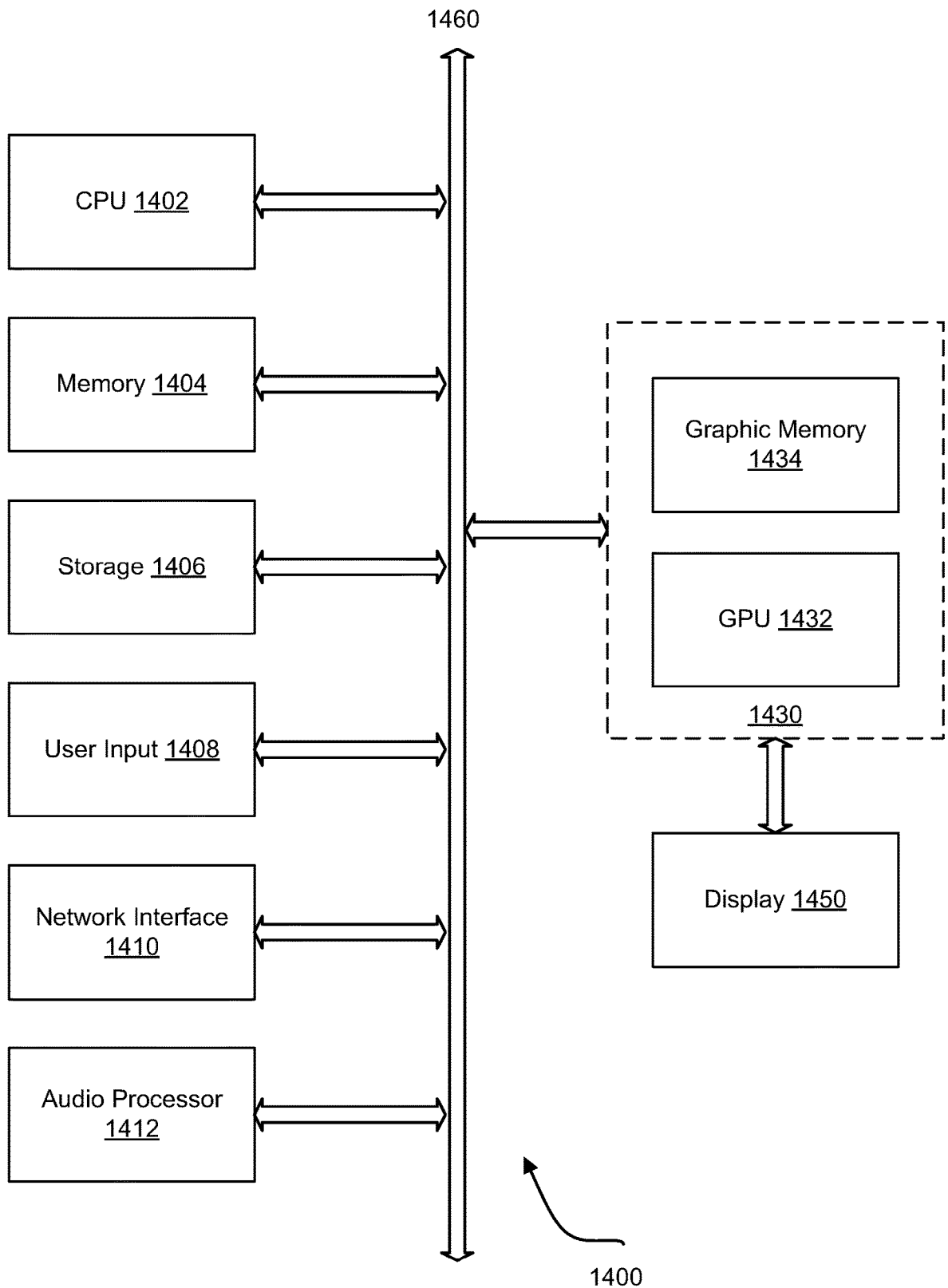
FIG. 14 illustrates an example of a hardware system suitable for implementing a computer system, according to embodiments of the present disclosure.

FIG. 14 illustrates an example of a hardware system suitable for implementing a computer system 1400, according to embodiments of the present disclosure. The computer system 1400 represents, for example, a video game console, a video game platform, or other types of a computer system. The computer system 1400 includes a central processing unit (CPU) 1402 for running software applications and optionally an operating system. The CPU 1402 may be made up of one or more homogeneous or heterogeneous processing cores. Memory 1404 stores applications and data for use by the CPU 1402. Storage 1406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1408 communicate user inputs from one or more users to the computer system 1400, examples of which may include keyboards, mice, joysticks, touch pads, touch screens, still or video cameras, and/or microphones. Network interface 1410 allows the computer system 1400 to communicate with other computer systems via an electronic communications network, and may include wired or wireless communication over local area networks and wide area networks such as the Internet. An audio processor 1412 is adapted to generate analog or digital audio output from instructions and/or data provided by the CPU 1402, memory 1404, and/or storage 1406. The components of computer system 1400, including the CPU 1402, memory 1404, data storage 1406, user input devices 1408, network interface 1410, and audio processor 1412 are connected via one or more data buses 1460.

A graphics subsystem 1430 is further connected with the data bus 1460 and the components of the computer system 1400. The graphics subsystem 1430 includes a graphics processing unit (GPU) 1432 and graphics memory 1434. The graphics memory 1434 includes a display memory (e.g., a frame buffer) used for storing pixel data for each pixel of an output image. The graphics memory 1434 can be integrated in the same device as the GPU 1432, connected as a separate device with the GPU 1432, and/or implemented within the memory 1404. Pixel data can be provided to the graphics memory 1434 directly from the CPU 1402. Alternatively, the CPU 1402 provides the GPU 1432 with data and/or instructions defining the desired output images, from which the GPU 1432 generates the pixel data of one or more output images. The data and/or instructions defining the desired output images can be stored in the memory 1404 and/or graphics memory 1434. In embodiments, the GPU 1432 includes 3D rendering capabilities for generating pixel data for output images from instructions and data defining the geometry, lighting, shading, texturing, motion, and/or camera parameters for a scene. The GPU 1432 can further include one or more programmable execution units capable of executing shader programs.

The graphics subsystem 1430 periodically outputs pixel data for an image from the graphics memory 1434 to be displayed on the display device 1450. The display device 1450 can be any device capable of displaying visual information in response to a signal from the computer system 1400, including CRT, LCD, plasma, and OLED displays. The computer system 1400 can provide the display device 1450 with an analog or digital signal.

In accordance with various embodiments, the CPU 1402 is one or more general-purpose microprocessors having one or more processing cores. Further embodiments can be implemented using one or more CPUs 1402 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 155%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method implemented by a computer system, the method including:

receiving an identifier of an activity in a video game and first data indicating a completion of the activity by a video game player, wherein the identifier is predefined in program code of the video game, wherein the identifier and the first data are received based on an execution of the program code that includes instrumentation to generate one or more events, and wherein the one or more events are defined according to event definitions that are common to a plurality of video games that includes the video game;

storing the identifier and the first data in a data store;

determining, from the data store and based on the identifier, second data indicating completion of the activity by a plurality of video game players;

determining measurements about the completion of the activity by the plurality of the video game players based on the second data, wherein the measurements include at least one of (i) time to successfully complete the activity or (ii) time to attempt completing the activity based on a type of the activity;

estimating, for a user that has not completed the activity, a length of time to complete the activity based on the measurements; and presenting the length of time on a display that is communicatively coupled with a computing device operated by the user, the computing device being one of a plurality of device types, the presentation being common with at least one of: (I) presentation on the display of other estimates of times to complete activities being executed on the computing device that are associated with respective video games of the plurality of video games, or (II) presentation of estimates of times to complete activities of video games of the plurality of video games on respective displays of other devices of the plurality of device types, the common presentation based at least in part on the instrumentation.

2. The method of claim 1, wherein the first data includes a start event and an end event, wherein the end event includes an outcome of the completion of the activity by the video game player, and wherein determining the measurements includes:

determining, in association with the video game player and from the start event and the end event, at least one of the time of the video game player to successfully complete the activity or the time of the video game player to attempt completing the activity.

3. The method of claim 2, wherein estimating the length of time includes:

generating, based on start events and end events from the second data, a statistical distribution of at least one of the time to successfully complete the activity or the time to attempt completing the activity; and determining the length of time from the statistical distribution based on a predefined percentile.

4. The method of claim 1, further including:

determining the type of the activity based on an association between the type of the activity and the identifier of the activity, wherein the association is stored in the data store, and wherein:

the type of the activity indicates that the activity includes at least one of: a progress activity, a competitive activity, or a challenge activity, the progress activity is associated with a failure and a success, the competitive activity is associated with synchronous play against a first video game player or against a first virtual player, and the challenge activity is associated with asynchronous play against a second video game player or against a second virtual player.

5. The method of claim 4, wherein the measurements used for the progress activity includes the time per video game player to successfully complete the activity, wherein the measurements used for the competitive activity or the challenge activity includes the time per video game player to attempt completing the activity, and wherein the time to successfully complete the activity includes failure times.

6. The method of claim 1, wherein the activity includes a plurality of tasks, wherein each one of the plurality of tasks is associated with an individual length of time, wherein each individual length time of time is estimated based on the measurements of the plurality of the video game players, and wherein estimating the length of time includes combining the individual lengths of time of the plurality of tasks.

7. The method of claim 6, further including:

receiving, from a video game console of the user, the identifier of the activity and event data indicating a completion of a first task of the plurality of tasks;

determining a remaining length of time to complete the activity based on the individual lengths of time of remaining ones of the plurality of tasks that have not been completed; and presenting the remaining length of time to the user.

8. The method of claim 1, further including:

determining that the length of time falls within a time range predefined for the type of the activity; and selecting, based on the length of time, the activity from candidate activities associated with the video game and another video game.

9. The method of claim 1, further comprising:

determining a type of the computing device operated by the user, wherein the type is one of a plurality is one of a plurality of computing device types that includes at least one of a video game console, a mobile device, or a user input device; and adjusting the length of time based at least in part on the type of computing device.

10. A computer system including:

one or more processors; and one or more memories storing computer-readable instructions that, upon execution by the one or more processors, configure the computer system to:

receive an identifier of an activity in a video game and first data indicating a completion of the activity by a video game player, wherein the identifier is predefined in program code of the video game, wherein the identifier and the first data are received based on an execution of the program code that includes instrumentation to generate one or more events, and wherein the one or more events are defined according to event definitions that are common to a plurality of video games that includes the video game;

store the identifier and the first data in a data store;

determine, from the data store and based on the identifier, second data indicating completion of the activity by a plurality of video game players;

determine measurements about the completion of the activity by the plurality of the video game players based on the second data, wherein the measurements include at least one of (i) time to successfully complete the activity or (ii) time to attempt completing the activity based on a type of the activity;

estimate, for a user that has not completed the activity, a length of time to complete the activity based on the measurements; and present the length of time on a display that is communicatively coupled with a computing device operated by the user, the computing device being one of a plurality of device types, the presentation being common with at least one of: (I) presentation on the display of other estimates of times to complete activities being executed on the computing device that are associated with respective video games of the plurality of video games, or (II) presentation of estimates of times to complete activities of video games of the plurality of video games on respective displays of other devices of the plurality of device types, the common presentation based at least in part on the instrumentation.

11. The computer system of claim 10, wherein the activity includes a multi-player task, and wherein the execution of the computer-readable instructions further configure the computer system to:
- determine a subset of the plurality of the video game players that jointly completed the multi-player task; and
- determine a start and an end of the activity as jointly completed by the subset, wherein the measurements include a measurement corresponding to the start and the end.

12. The computer system of claim 10, wherein presenting the length of time includes sending the length of time to an application executing on the user device, and wherein the execution of the computer-readable instructions further configure the computer system to:
- receive, from a video game console of the user, the identifier of the activity and third data indicating completion of the activity by the user; and
- store the third data in the data store.

13. The computer system of claim 10, wherein the execution of the computer-readable instructions further configure the computer system to:
- receive, from a video game console of the user, the identifier of the activity and third data indicating a start of the activity by the user;
- determine that a duration since the start exceeds the length of time by a threshold amount and that no end of the activity by the user has been received; and
- present a help option to the user.

14. The computer system of claim 10, wherein the execution of the computer-readable instructions further configure the computer system to:
- determine a type of the computing device operated by the user, wherein the type is one of a plurality is one of a plurality of computing device types that includes at least one of a video game console, a mobile device, or a user input device; and
- adjust the length of time based at least in part on the type of computing device.

15. One or more non-transitory computer-readable storage media storing instructions that, upon execution on a computer system, cause the computer system to perform operations including:
- receiving an identifier of an activity in a video game and first data indicating a completion of the activity by a video game player, wherein the identifier is predefined in program code of the video game, wherein the identifier and the first data are received based on an execution of the program code that includes instrumentation to generate one or more events, and wherein the one or more events are defined according to event definitions that are common to a plurality of video games that includes the video game;
- storing the identifier and the first data in a data store;
- determining, from the data store and based on the identifier, second data indicating completion of the activity by a plurality of video game players;
- determining measurements about the completion of the activity by the plurality of the video game players based on the second data, wherein the measurements include at least one of (i) time to successfully complete the activity or (ii) time to attempt completing the activity based on a type of the activity;
- estimating, for a user that has not completed the activity, a length of time to complete the activity based on the measurements; and
- presenting the length of time on a display that is communicatively coupled with a computing device operated by the user, the computing device being one of a plurality of device types, the presentation being common with at least one of: (I) presentation on the display of other estimates of times to complete activities being executed on the computing device that are associated with respective video games of the plurality of video games, or (II) presentation of estimates of times to complete activities of video games of the plurality of video games on respective displays of other devices of the plurality of device types, the common presentation based at least in part on the instrumentation.

16. The one or more non-transitory computer-readable storage media of claim 15, wherein the operations further include:
- estimating an average time of the user for activity completion based on a playtime history of the user and playtime histories of the plurality of video game players; and
- adjusting the length of time based on the average of time.

17. The one or more non-transitory computer-readable storage media of claim 16, wherein estimating the operations further include:
- generating, based on the playtime histories, a decile distribution of the plurality of video game players, wherein each decile corresponds to a player average time for activity completion; and
- determining, based on the playtime history of the user, that the user belongs to a decile of the decile distribution, wherein the average time of the user corresponds to the decile.

18. The one or more non-transitory computer-readable storage media of claim 15, wherein the operations further include:
- generating, based on playtime histories of the video game players, cohorts of the plurality of video game players;
- determining, based on a playtime history of the user, that the user belongs to a cohort of the cohorts; and
- determining a subset of the plurality of the video game players that belong to the cohort, wherein the measurements are determined for the subset.

19. The one or more non-transitory computer-readable storage media of claim 15, wherein the operations further include:
- adjusting the length of time based on at least one of: a tool available to the user in the video game to complete the activity, a familiarity measure of the user using the tool, a first location of the user in a virtual zone within the video game relative to a second location of the activity, or a travel time between the first location and the second location.

20. The one or more non-transitory computer-readable storage media of claim 15, wherein the operations further include:
- determining a type of the computing device operated by the user, wherein the type is one of a plurality is one of a plurality of computing device types that includes at least one of a video game console, a mobile device, or a user input device; and
- adjusting the length of time based at least in part on the type of computing device.

* * * * *